(12) United States Patent
Zheng et al.

(10) Patent No.: US 12,450,797 B2
(45) Date of Patent: Oct. 21, 2025

(54) HANDWRITING FORMING METHOD AND APPARATUS, AND ELECTRONIC DEVICE

(71) Applicant: BOE Technology Group Co., Ltd., Beijing (CN)

(72) Inventors: Rui Zheng, Beijing (CN); Fengshuo Hu, Beijing (CN); Honghong Jia, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 217 days.

(21) Appl. No.: 18/474,773

(22) Filed: Sep. 26, 2023

(65) Prior Publication Data

US 2024/0020893 A1   Jan. 18, 2024

Related U.S. Application Data

(63) Continuation-in-part of application No. 17/626,683, filed as application No. PCT/CN2021/080511 on Mar. 12, 2021, now Pat. No. 11,809,701.

(30) Foreign Application Priority Data

Apr. 30, 2020   (CN) .......................... 202010367901.X

(51) Int. Cl.
   *G06T 11/20*   (2006.01)
   *G06F 3/04883*   (2022.01)
   (Continued)

(52) U.S. Cl.
   CPC ........ *G06T 11/203* (2013.01); *G06F 3/04883* (2013.01); *G06T 5/70* (2024.01); *G06T 11/40* (2013.01); *G06T 2207/20192* (2013.01)

(58) Field of Classification Search
   None
   See application file for complete search history.

(56) References Cited

U.S. PATENT DOCUMENTS

2013/0308863 A1* 11/2013 Zou ...................... G06T 11/203
                                                                    382/186

FOREIGN PATENT DOCUMENTS

CN   101373539 A  *  2/2009
CN   103823628 A     5/2014
   (Continued)

OTHER PUBLICATIONS

May 31, 2021—(CN) International Search Report and Written Opinion Appn PCT/CN2021/080511.
   (Continued)

*Primary Examiner* — Tuan S Nguyen
(74) *Attorney, Agent, or Firm* — Banner & Witcoff, Ltd.

(57) ABSTRACT

A handwriting forming method, a handwriting forming apparatus, and an electronic device are provided. The method includes: determining a group of plurality of trajectory points and obtaining trajectory information of each of the plurality of trajectory points, the trajectory information including a pressure value; establishing a plurality of trajectory units corresponding to the plurality of trajectory points in one-to-one correspondence based on the trajectory information; and connecting the plurality of trajectory units to form a handwriting for displaying. A size of each trajectory unit is determined based on a pressure sensing amount corresponding to the trajectory unit, and the pressure sensing amount is obtained based on the pressure value of a corresponding trajectory point. In the case where the pressure value is less than a first threshold, the pressure sensing amount is a first constant regardless of whether the pressure value of the corresponding trajectory point changes.

20 Claims, 14 Drawing Sheets

(51) Int. Cl.
*G06T 5/70* (2024.01)
*G06T 11/40* (2006.01)

(56) References Cited

FOREIGN PATENT DOCUMENTS

| CN | 107219941 A | * | 9/2017 | ......... G06F 3/04812 |
| CN | 109671133 A | * | 4/2019 | ............. G06T 11/20 |
| CN | 110515527 A | * | 11/2019 | ......... G06F 3/04883 |

OTHER PUBLICATIONS

Jun. 30, 2023—(US) Notice of Allowance and Fee(s) U.S. Appl. No. 17/626,683.

* cited by examiner

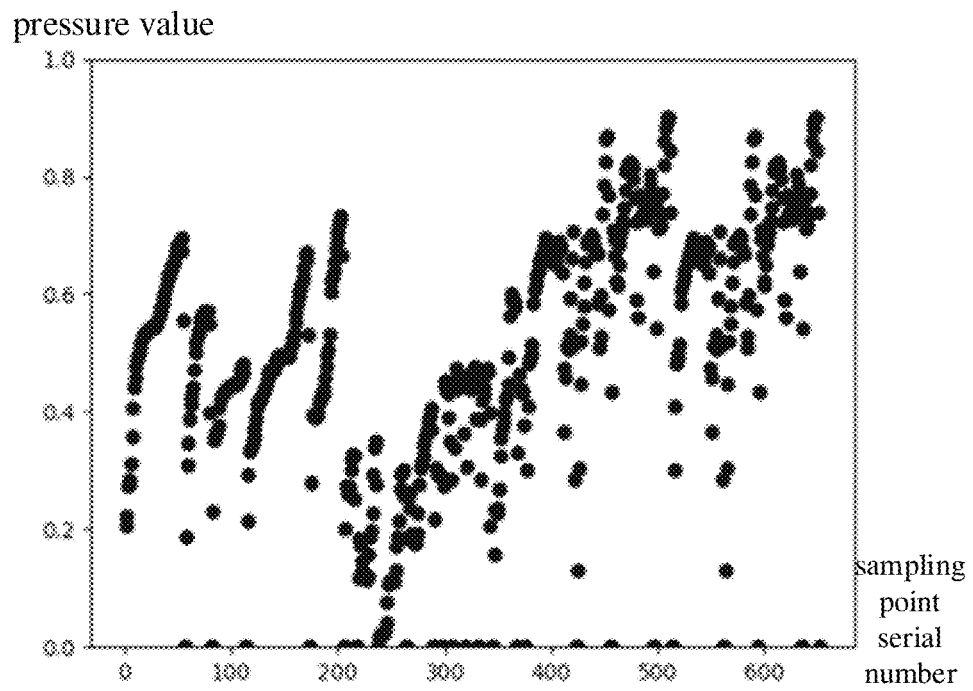

FIG. 5 for trajectory points other than the pen drop point, calculating a slope of a connection line between a current trajectory point and a previous trajectory point — S131 according to the slope, a coordinate of the current trajectory point, and a coordinate of the previous trajectory point, determining a connection mode adopted by a trajectory unit corresponding to the current trajectory point — S132

FIG. 6

HANDWRITING FORMING METHOD AND APPARATUS, AND ELECTRONIC DEVICE

The present application is a continuation in part of U.S. patent application Ser. No. 17/626,683 filed on Jan. 12, 2022, which is a U.S. National Phase Entry of International Application No. PCT/CN2021/080511 filed on Mar. 12, 2021, which claims the priority of the Chinese patent application No. 202010367901.X, filed on Apr. 30, 2020, and the entireties of the above-identified applications are incorporated herein by reference as part of the present application.

TECHNICAL FIELD

Embodiments of the present disclosure relate to a handwriting forming method, a handwriting forming apparatus, and an electronic device.

BACKGROUND

With the continuous development of touch screen technology, touch screens have been widely used in intelligent terminals. Users can interact with an intelligent terminal through a touch screen, thereby completing the operation process of the intelligent terminal conveniently. Various application programs for intelligent terminals are also widely developed, for example, the application programs for writing and drawing on the terminal device. Users can use a corresponding application program to operate on the touch screen with a finger or a stylus, so that writing can be performed and various patterns can be drawn.

SUMMARY

At least one embodiment of the present disclosure provides a handwriting forming method, and the method comprising: determining a group of plurality of trajectory points according to a plurality of sampling points on a writing path on a working surface of a touch device and obtaining trajectory information of each of the plurality of trajectory points, in which the trajectory information comprises a coordinate, a flag bit and a pressure value, and the flag bit comprises data indicating whether a corresponding trajectory point is a pen drop point; establishing a plurality of trajectory units in a raindrop shape corresponding to the plurality of trajectory points in one-to-one correspondence based on the trajectory information; determining a connection mode between trajectory units corresponding to adjacent trajectory points based on the trajectory information; and calculating connection points of the trajectory units according to the connection mode, and filling a polygon formed by the connection points of the trajectory units corresponding to the adjacent trajectory points, so as to form a handwriting for displaying.

For example, in the method provided by an embodiment of the present disclosure, establishing the plurality of trajectory units in the raindrop shape corresponding to the plurality of trajectory points in one-to-one correspondence based on the trajectory information comprises: determining a first circle center coordinate of a first circle and a first radius of the first circle; determining a second circle center coordinate of a second circle and a second radius of the second circle; and filling the first circle and the second circle, and filling a polygon formed by common tangent points of the first circle and common tangent points of the second circle.

For example, in the method provided by an embodiment of the present disclosure, the first circle center coordinate is a coordinate of the corresponding trajectory point, the first radius is a product of a pressure sensing amount and a plurality of writing parameter preset values, the pressure sensing amount is obtained based on a pressure value of the corresponding trajectory point, and the first radius is greater than the second radius.

For example, in the method provided by an embodiment of the present disclosure, the pressure sensing amount is calculated according to a pressure sensing function:

$$Pz = \begin{cases} 0.25, P < 0.4 \\ P^2/0.64, 0.4 \leq P < 0.8, \\ 1, P \geq 0.8 \end{cases}$$

where Pz represents the pressure sensing amount and P represents the pressure value.

For example, in the method provided by an embodiment of the present disclosure, the second circle center coordinate is obtained according to the first circle center coordinate, a circle center distance, and an angle of a circle center connection line, the circle center distance is Q times of a product of a brush length and a pressure value of the corresponding trajectory point, and $2 \leq Q \leq 7$, the angle of the circle center connection line is an angle between a connection line between a circle center of the first circle and a circle center of the second circle and an x-axis direction of a coordinate system where the first circle center coordinate is located, and the angle of the circle center connection line ranges from 15 to 60 degrees.

For example, in the method provided by an embodiment of the present disclosure, $4.5 \leq Q \leq 5.5$, and the angle of the circle center connection line ranges from 25 to 35 degrees.

For example, in the method provided by an embodiment of the present disclosure, the second radius is calculated according to a formula: $R2 = 0.5 * R1 * t$, where R1 represents the first radius, R2 represents the second radius, t represents an ink density, $t = \max(0.8 * T/n, 0.6)$, T is a constant, and n is a serial number of a trajectory point.

For example, in the method provided by an embodiment of the present disclosure, determining the connection mode between the trajectory units corresponding to the adjacent trajectory points based on the trajectory information comprises: for trajectory points other than the pen drop point, calculating a slope of a connection line between a current trajectory point and a previous trajectory point; and according to the slope, a coordinate of the current trajectory point, and a coordinate of the previous trajectory point, determining a connection mode adopted by a trajectory unit corresponding to the current trajectory point. The slope is calculated according to a formula:

$$k = \frac{y2 - y1}{x2 - x1},$$

where k represents the slope, (x2, y2) represents the coordinate of the current trajectory point, and (x1, y1) represents the coordinate of the previous trajectory point.

For example, in the method provided by an embodiment of the present disclosure, the connection mode comprises a first connection mode, a second connection mode, a third connection mode, and a fourth connection mode. According to the slope, the coordinate of the current trajectory point, and the coordinate of the previous trajectory point, determining the connection mode adopted by the trajectory unit corresponding to the current trajectory point comprises: in the case where |k|≤0.6 or |x2−x1|<1, determining that the trajectory unit corresponding to the current trajectory point adopts the first connection mode; in the case where −0.9<k<−0.6 and x2>x1, determining that the trajectory unit corresponding to the current trajectory point adopts the second connection mode; in the case where 0.6<k<1 and y2<y1, determining that the trajectory unit corresponding to the current trajectory point adopts the third connection mode; and otherwise, determining that the trajectory unit corresponding to the current trajectory point adopts the fourth connection mode.

For example, in the method provided by an embodiment of the present disclosure, calculating the connection points of the trajectory units according to the connection mode, and filling the polygon formed by the connection points of the trajectory units corresponding to the adjacent trajectory points, so as to form the handwriting for displaying, comprises: for the trajectory points other than the pen drop point, calculating the connection points of the trajectory unit according to one selected from a group consisting of the first connection mode, the second connection mode, the third connection mode, and the fourth connection mode that are determined; and filling the polygon formed by the connection points of the trajectory units corresponding to the adjacent trajectory points.

For example, in the method provided by an embodiment of the present disclosure, the connection points of the trajectory unit comprise a first connection point m1 and a second connection point n1, and in the case of adopting the first connection mode, the first connection point m1 and the second connection point n1 are calculated according to a formula:

$$\begin{cases} m.x = \text{floor}(c1.x - R1*\cos\theta) \\ m.y = \text{floor}(c1.y - R1*\sin\theta) \\ n.x = c2.x + R2*\cos\theta \\ n.y = \text{floor}(c2.y + R2) \end{cases},$$

where (m.x, m.y) represents a coordinate of the first connection point m1, (n.x, n.y) represents a coordinate of the second connection point n1, (c1.x, c1.y) represents the first circle center coordinate, (c2.x, c2.y) represents the second circle center coordinate, R1 represents the first radius, R2 represents the second radius, θ represents an angle of a circle center connection line, and the coordinate of the first connection point m1, the coordinate of the second connection point n1, the first circle center coordinate, and the second circle center coordinate are located in a same coordinate system on the working surface of the touch device.

For example, in the method provided by an embodiment of the present disclosure, the connection points of the trajectory unit comprise a first connection point m2 and a second connection point n2, and in the case of adopting the second connection mode, the first connection point m2 and the second connection point n2 are calculated according to a formula:

$$\begin{cases} m.x = c2.x - R1 \\ m.y = \text{floor}(c2.y - R2) - 2 \\ n.x = c2.x - R1 \\ n.y = \text{ceil}(c2.y + R2) + 1 \end{cases},$$

where (m.x, m.y) represents a coordinate of the first connection point m2, (n.x, n.y) represents a coordinate of the second connection point n2, (c2.x, c2.y) represents the second circle center coordinate, R1 represents the first radius, R2 represents the second radius, and the coordinate of the first connection point m2, the coordinate of the second connection point n2, and the second circle center coordinate are located in a same coordinate system on the working surface of the touch device.

For example, in the method provided by an embodiment of the present disclosure, the connection points of the trajectory unit comprise a first connection point m3 and a second connection point n3, and in the case of adopting the third connection mode, the first connection point m3 and the second connection point n3 are calculated according to a formula:

$$\begin{cases} m.x = c2x \\ m.y = \text{floor}(c2.y - R2) \\ n.x = c2.x \\ n.y = \text{ceil}(c2.y + R2) \end{cases},$$

where (m.x, m.y) represents a coordinate of the first connection point m3, (n.x, n.y) represents a coordinate of the second connection point n3, (c2.x, c2.y) represents the second circle center coordinate, R2 represents the second radius, and the coordinate of the first connection point m3, the coordinate of the second connection point n3, and the second circle center coordinate are located in a same coordinate system on the working surface of the touch device.

For example, in the method provided by an embodiment of the present disclosure, the connection points of the trajectory unit comprise a first connection point m4 and a second connection point n4, and in the case of adopting the fourth connection mode, the first connection point m4 and the second connection point n4 are calculated according to a formula:

$$\begin{cases} m.x = \text{floor}(c1.x - R1^*\cos\theta) \\ m.y = \text{floor}(c1.y - R1^*\sin\theta) \\ n.x = \text{ceil}(c2.x + R2^*\cos\theta) \\ n.y = \text{floor}(c2.y + R2) - 1 \end{cases},$$

where (m.x, m.y) represents a coordinate of the first connection point m4, (n.x, n.y) represents a coordinate of the second connection point n4, (c1.x, c1.y) represents the first circle center coordinate, (c2.x, c2.y) represents the second circle center coordinate, R1 represents the first radius, R2 represents the second radius, θ represents an angle of a circle center connection line, and the coordinate of the first connection point m4, the coordinate of the second connection point n4, the first circle center coordinate, and the second circle center coordinate are located in a same coordinate system on the working surface of the touch device.

For example, in the method provided by an embodiment of the present disclosure, calculating the connection points of the trajectory units according to the connection mode, and filling the polygon formed by the connection points of the trajectory units corresponding to the adjacent trajectory points, so as to form the handwriting for displaying, further comprises: for a trajectory point serving as the pen drop point, determining connection points of a trajectory unit corresponding to the pen drop point according to a connection mode of a trajectory unit corresponding to a trajectory point that is adjacent to the pen drop point.

For example, in the method provided by an embodiment of the present disclosure, for the trajectory point serving as the pen drop point, determining the connection points of the trajectory unit corresponding to the pen drop point according to the connection mode of the trajectory unit corresponding to the trajectory point that is adjacent to the pen drop point comprises: in the case where the connection mode of the trajectory unit corresponding to the trajectory point that is adjacent to the pen drop point is the first connection mode, the second connection mode or the third connection mode, determining the connection points of the trajectory unit corresponding to the pen drop point by adopting the connection mode of the trajectory unit corresponding to the trajectory point that is adjacent to the pen drop point; and in the case where the connection mode of the trajectory unit corresponding to the trajectory point that is adjacent to the pen drop point is the fourth connection mode, calculating a first connection point m5 and a second connection point n5 of the trajectory unit corresponding to the pen drop point according to a formula:

$$\begin{cases} m \cdot x = c1 \cdot x \\ m \cdot y = c1 \cdot y + R1 \\ n \cdot x = c2 \cdot x + R2^* \cos \theta \\ n \cdot y = c2 \cdot y + R2^* \sin \theta + 1 \end{cases},$$

where (m.x, m.y) represents a coordinate of the first connection point m5, (n.x, n.y) represents a coordinate of the second connection point n5, (c1.x, c1.y) represents the first circle center coordinate, (c2.x, c2.y) represents the second circle center coordinate, R1 represents the first radius, R2 represents the second radius, θ represents an angle of a circle center connection line, and the coordinate of the first connection point m5, the coordinate of the second connection point n5, the first circle center coordinate, and the second circle center coordinate are located in a same coordinate system on the working surface of the touch device.

For example, in the method provided by an embodiment of the present disclosure, calculating the connection points of the trajectory units according to the connection mode, and filling the polygon formed by the connection points of the trajectory units corresponding to the adjacent trajectory points, so as to form the handwriting for displaying, further comprises: before filling the polygon formed by the connection points of the trajectory units corresponding to the adjacent trajectory points, judging whether the connection mode of the trajectory unit corresponding to the current trajectory point is different from the connection mode of the trajectory unit corresponding to the previous trajectory point; and in the case of being different, calculating connection points of a trajectory unit corresponding to the previous trajectory point by adopting the connection mode of the trajectory unit corresponding to the current trajectory point, to serve as repeated connection points of the trajectory unit corresponding to the previous trajectory point. In the case of filling the polygon formed by the connection points of the trajectory units corresponding to the adjacent trajectory points, the polygon between the trajectory unit corresponding to the previous trajectory point and the trajectory unit corresponding to the current trajectory point is formed based on the repeated connection points.

For example, in the method provided by an embodiment of the present disclosure, before establishing the plurality of trajectory units in the raindrop shape, the method further comprises: selecting continuous Z trajectory points comprising the pen drop point, adding a compensation value to the pressure value in the trajectory information of each of the Z trajectory points to obtain an updated pressure value, and replacing the pressure value in the trajectory information with the updated pressure value, where 5≤Z≤15 and Z is an integer.

For example, in the method provided by an embodiment of the present disclosure, Z compensation values corresponding to the Z trajectory points are successively reduced.

For example, the method provided by an embodiment of the present disclosure further comprises: performing an anti-aliasing treatment on an edge line of a filled pattern.

For example, in the method provided by an embodiment of the present disclosure, performing the anti-aliasing treatment on the edge line of the filled pattern comprises: dividing each display pixel that the edge line passes through into two regions according to a diagonal line of the display pixel, in which a sign of a slope of the diagonal line is same as a sign of a slope of the edge line; judging a region where a line segment of the edge line passing through the display pixel is located; in the case where the line segment is located in one of the two regions, allowing the display pixel where the line segment is located and a display pixel that is adjacent to the region where the line segment is located in a y direction to display; and in the case where the line segment coincides with the diagonal line, allowing the display pixel where the line segment is located to display.

For example, in the method provided by an embodiment of the present disclosure, transparency of the display pixel that is adjacent to the region where the line segment is located in the y direction is calculated according to a formula:

$$Td = \left| 1 - \frac{d_M}{\sqrt{2}/2} \right|,$$

where Td represents the transparency, and $d_{MN}$ represents a distance between vertices of the region where the line segment is located and the line segment.

For example, in the method provided by an embodiment of the present disclosure, determining the group of plurality of trajectory points according to the plurality of sampling points on the writing path on the working surface of the touch device and obtaining the trajectory information of each of the plurality of trajectory points comprises: selecting a part of sampling points out of all the sampling points on the writing path; and obtaining the plurality of trajectory points based on the part of the sampling points and obtaining the trajectory information of the plurality of trajectory points.

For example, in the method provided by an embodiment of the present disclosure, a ratio of a number of the part of the sampling points to a number of all the sampling points ranges from 1% to 5%.

At least one embodiment of the present disclosure further provides a handwriting forming apparatus, which comprises: a sampling unit, configured to determine a group of plurality of trajectory points according to a plurality of sampling points on a writing path on a working surface of a touch device and obtain trajectory information of each of the plurality of trajectory points, in which the trajectory information comprises a coordinate, a flag bit and a pressure value, and the flag bit comprises data indicating whether a corresponding trajectory point is a pen drop point; a modeling unit, configured to establish a plurality of trajectory units in a raindrop shape corresponding to the plurality of trajectory points in one-to-one correspondence based on the trajectory information; a connection mode determining unit, configured to determine a connection mode between trajectory units corresponding to adjacent trajectory points based on the trajectory information; and a filling unit, configured to calculate connection points of the trajectory units according to the connection mode, and fill a polygon formed by the connection points of the trajectory units corresponding to the adjacent trajectory points, so as to form a handwriting for displaying.

At least one embodiment of the present disclosure further provides an electronic device, which comprises: a processor; and a memory, comprising one or more computer program modules. The one or more computer program modules are stored in the memory and configured to be executed by the processor, and the one or more computer program modules comprise instructions for implementing the handwriting forming method provided by any one of the embodiments of the present disclosure.

For example, the electronic device provided by an embodiment of the present disclosure further comprises the touch device. The touch device is configured to acquire an initial handwriting on the working surface of the touch device.

For example, the electronic device provided by an embodiment of the present disclosure further comprises a display device. The display device is configured to display the handwriting formed by the handwriting forming method.

At least one embodiment of the present disclosure further provides a handwriting forming method, which comprises: determining a group of plurality of trajectory points and obtaining trajectory information of each of the plurality of trajectory points, where the trajectory information comprises a pressure value; establishing a plurality of trajectory units corresponding to the plurality of trajectory points in one-to-one correspondence based on the trajectory information; and connecting the plurality of trajectory units to form a handwriting for displaying. A size of each trajectory unit is determined based on a pressure sensing amount corresponding to the trajectory unit, and the pressure sensing amount is obtained based on the pressure value of a corresponding trajectory point; and in the case where the pressure value of the corresponding trajectory point is less than a first threshold, the pressure sensing amount is a first constant regardless of whether the pressure value of the corresponding trajectory point changes.

For example, in the method provided by an embodiment of the present disclosure, in the case where the pressure value of the corresponding trajectory point is greater than or equal to a second threshold, the pressure sensing amount is a second constant regardless of whether the pressure value of the corresponding trajectory point changes.

For example, in the method provided by an embodiment of the present disclosure, in the case where the pressure value of the corresponding trajectory point is no less than the first threshold and is less than the second threshold, the pressure sensing amount increases along with increasing of the pressure value of the corresponding trajectory point.

For example, in the method provided by an embodiment of the present disclosure, the first threshold is equal to 0.4, and the first constant is equal to 0.25.

For example, in the method provided by an embodiment of the present disclosure, the second threshold is equal to 0.8, and the second constant is equal to 1.

For example, in the method provided by an embodiment of the present disclosure, the first threshold is equal to 0.4, the first constant is equal to 0.25, the second threshold is equal to 0.8, and the second constant is equal to 1; and the pressure sensing amount is calculated according to a pressure sensing function:

$$Pz = \begin{cases} 0.25, P < 0.4 \\ P^2/0.64, 0.4 \leq P < 0.8, \\ 1, P \geq 0.8 \end{cases}$$

where Pz represents the pressure sensing amount and P represents the pressure value of the corresponding trajectory point.

For example, in the method provided by an embodiment of the present disclosure, before establishing the plurality of trajectory units, the method further comprises: performing compensation on the pressure value in the trajectory information.

For example, in the method provided by an embodiment of the present disclosure, performing compensation on the pressure value in the trajectory information comprises: selecting continuous Z trajectory points comprising a pen drop point, wherein the pen drop point is one trajectory point among the Z trajectory points and is a first trajectory point in a trajectory, and Z is a positive integer; adding a compensation value to the pressure value in the trajectory information of each of the Z trajectory points, so as to obtain an updated pressure value; and replacing the pressure value in the trajectory information with the updated pressure value.

For example, in the method provided by an embodiment of the present disclosure, $5 \leq Z \leq 15$.

For example, in the method provided by an embodiment of the present disclosure, Z compensation values corresponding to the Z trajectory points are successively reduced.

For example, in the method provided by an embodiment of the present disclosure, the trajectory information further comprises a flag bit, and the flag bit comprises data indicating whether a corresponding trajectory point is the pen drop point.

For example, in the method provided by an embodiment of the present disclosure, the size of the trajectory unit is a maximum distance between two points on edges of the trajectory unit.

For example, in the method provided by an embodiment of the present disclosure, the size of the trajectory unit is a radius, an edge length, or a diagonal of the trajectory unit.

For example, in the method provided by an embodiment of the present disclosure, connecting the plurality of trajectory units to form the handwriting for displaying comprises: determining a connection mode between trajectory units corresponding to adjacent trajectory points based on the trajectory information; and calculating connection points of the trajectory units according to the connection mode, and filling a polygon formed by the connection points of the trajectory units corresponding to the adjacent trajectory points, so as to form the handwriting for displaying.

At least one embodiment of the present disclosure further provides a handwriting forming apparatus, which comprises: a determining unit, configured to determine a group of plurality of trajectory points and obtain trajectory information of each of the plurality of trajectory points, where the trajectory information comprises a pressure value; a modeling unit, configured to establish a plurality of trajectory units corresponding to the plurality of trajectory points in one-to-one correspondence based on the trajectory information; and a connecting unit, configured to connect the plurality of trajectory units to form a handwriting for displaying. A size of each trajectory unit is determined based on a pressure sensing amount corresponding to the trajectory unit, and the pressure sensing amount is obtained based on the pressure value of a corresponding trajectory point; and in the case where the pressure value of the corresponding trajectory point is less than a first threshold, the pressure sensing amount is a first constant regardless of whether the pressure value of the corresponding trajectory point changes.

For example, in the apparatus provided by an embodiment of the present disclosure, in the case where the pressure value of the corresponding trajectory point is greater than or equal to a second threshold, the pressure sensing amount is a second constant regardless of whether the pressure value of the corresponding trajectory point changes.

BRIEF DESCRIPTION OF THE DRAWINGS

In order to illustrate the technical solutions of the embodiments of the present disclosure more clearly, the following will briefly introduce the attached drawings of the embodiments. Obviously, the attached drawings in the following description merely relate to some embodiments of the present disclosure and are not a limitation of the present disclosure.

FIG. 5 is a schematic diagram of pressure value samples provided by at least one embodiment of the present disclosure;

FIG. 6 is a flow diagram of step S130 in the handwriting forming method shown in FIG. 1;

DETAILED DESCRIPTION

Figure 1:
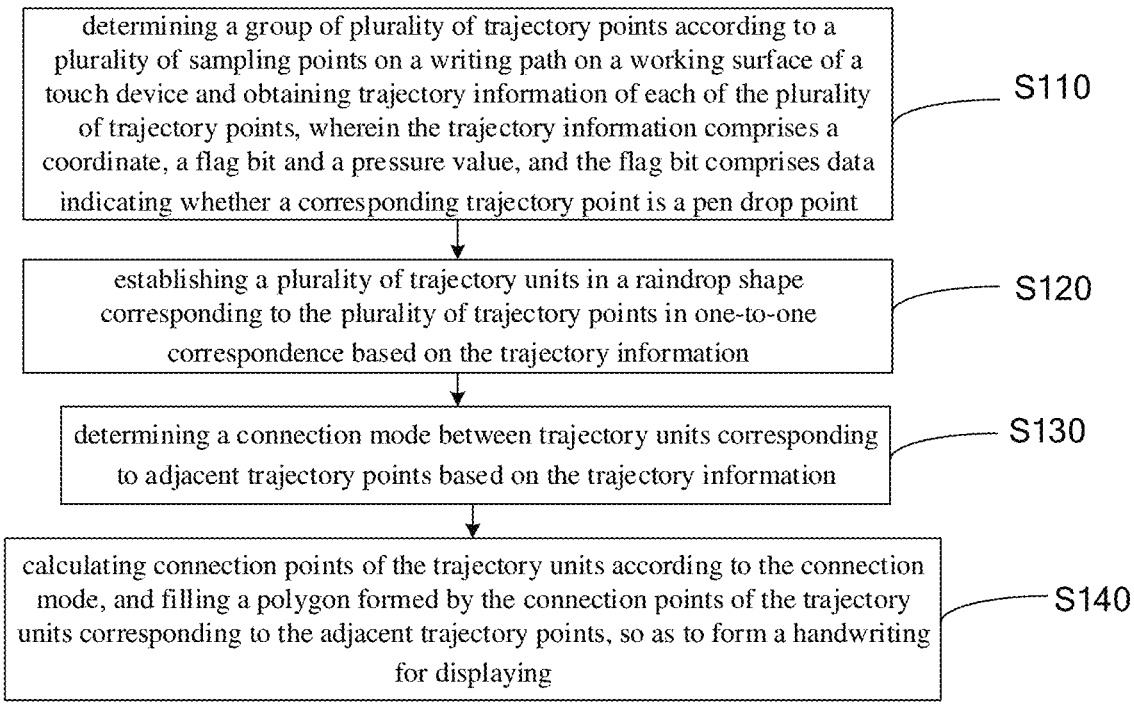
FIG. 1 is a flow diagram of a handwriting forming method provided by at least one embodiment of the present disclosure.

In order to make the purpose, technical solutions and advantages of the embodiments of the present disclosure clearer, the technical solutions in the embodiments of the present disclosure will be described clearly and completely in combination with the attached drawings in the embodiments of the present disclosure. Obviously, the described embodiments are only part of the embodiments of the present disclosure, not all of them. Based on the described embodiments of the present disclosure, all other embodiments obtained by the person of ordinary skill in the art without making creative work shall belong to the protection scope of the present disclosure.

Unless otherwise defined, the technical or scientific terms used in the present disclosure shall have usual meanings understood by those with ordinary skills in the field to which this disclosure belongs. The words "first", "second" and similar words used in the present disclosure do not mean any order, quantity, or importance, but are only used to distinguish different components. Similarly, similar words such as "an", "a" or "the" do not mean a quantity limit, but rather mean that there is at least one. Similar words such as "including" or "comprising" mean that the elements or items appearing before the word cover the elements or items listed after the word and their equivalents, but do not exclude other elements or items. Similar words such as "connecting" or "connected" are not limited to physical or mechanical connections, but can comprise electrical connections, whether direct or indirect. "Up", "Down", "Left", "Right", etc. are only used to indicate the relative position relationship, and in the case that the absolute position of the described object changes, the relative position relationship may also change accordingly.

In the process of writing when a user uses an intelligent terminal, the intelligent terminal can simulate and display the handwriting written by the user, and the handwriting can be displayed in various types such as Chinese brush pen writing, pen writing, etc. according to needs. The Chinese brush pen is a traditional Chinese writing tool and painting tool, and its tip is made of animal hair, for example, and is in a long cone shape after absorbing ink for writing, for example. Chinese brush pen writing has strong Chinese characteristics, reflects the charm of Chinese calligraphy, and can provide users with attractive visual effects.

However, in the usual method of simulating Chinese brush pen writing, a large number of sampling points are needed for calculation and processing, which results in a large amount of calculation, a lot of resources occupancy, and low processing efficiency. In addition, the usual method of simulating Chinese brush pen writing is mainly to establish handwriting models for different writing skills when writing with a Chinese brush pen, such as the hidden front and exposed front of the pen dropping, the slanted front and side front of the pen movement, etc., while ignoring the connection between the models, which makes the formed brush handwriting not smooth enough, aesthetics is insufficient, and the processing method is complicated and is not practical.

At least one embodiment of the present disclosure provides a handwriting forming method, a handwriting forming apparatus, and an electronic device. The handwriting forming method can obtain beautiful Chinese brush pen handwriting, can obtain smooth handwriting, can embody various strokes, has small calculation amount, high processing efficiency, and strong real-time performance, and is simple and practical.

Hereinafter, embodiments of the present disclosure will be explained in detail with reference to the attached drawings. It should be noted that the same reference numerals in different attached drawings will be used to refer to the same elements that have been described.

At least one embodiment of the present disclosure provides a handwriting forming method, and the handwriting forming method includes: determining a group of plurality of trajectory points according to a plurality of sampling points on a writing path on a working surface of a touch device, and obtaining trajectory information of each of the plurality of trajectory points, the trajectory information including a coordinate, a flag bit and a pressure value, and the flag bit including data indicating whether a corresponding trajectory point is a pen drop point; establishing a plurality of trajectory units in a raindrop shape corresponding to the plurality of trajectory points in one-to-one correspondence based on the trajectory information; determining a connection mode between trajectory units corresponding to adjacent trajectory points based on the trajectory information; and calculating connection points of the trajectory units according to the connection mode, and filling a polygon formed by the connection points of the trajectory units corresponding to the adjacent trajectory points, so as to form a handwriting for displaying.

FIG. 1 is a flow diagram of a handwriting forming method provided by at least one embodiment of the present disclosure.

For example, the handwriting forming method is applied to a computing device, and this computing device includes any electronic device with computing function, such as a mobile phone, a notebook computer, a tablet computer, a desktop computer, a server, etc., and the embodiments of the present disclosure are not limited in this aspect. For example, the computing device has a central processing unit (CPU) or a graphics processing unit (GPU), and also includes a memory. The memory is, for example, a non-volatile memory (for example, read only memory (ROM)), on which codes of an operating system are stored. For example, codes or instructions are also stored on the memory, and the handwriting forming method provided by the embodiments of the present disclosure can be realized by running these codes or instructions.

For example, the computing device can also include a touch device, such as a touch screen or a touch pad, to acquire initial handwriting formed on the working surface of the touch device when a user writes. The touch screen can not only receive initial handwriting, but also perform a corresponding display at the same time, for example, the touch screen can be a capacitive touch screen, such as a self-capacitive touch screen or a mutual-capacitive touch screen, and it can also be a resistive touch screen, a surface acoustic wave touch screen, an infrared touch screen, etc., and the embodiments of the present disclosure are not limited in this aspect. The user can write directly on the working surface of the touch screen with his/her finger, or can write on the working surface of the touch screen with an active stylus or a passive stylus, and the embodiments of the present disclosure are not limited in this aspect. Here, the working surface refers to a surface for detecting a user's touch operation, for example, a touch surface of a touch screen. It should be noted that in the embodiments of the present disclosure, the type of the touch device is not limited, and it can be not only a touch screen, but also any device with touch function such as an interactive whiteboard, which can be determined according to actual needs.

For example, the computing device can also include a display device, the display device is, for example, a liquid crystal display (LCD), an organic light emitting diode (OLED) display, a quantum dot light emitting diode (QLED) display, a projection component, a VR head mounted display device (for example, a VR helmet, VR glasses, etc.), an AR display device, etc., and the embodiments of the present disclosure are not limited in this aspect. The display device can display handwriting such as Chinese brush pen handwriting formed by the handwriting forming method provided by the embodiments of the present disclosure.

As shown in FIG. 1, in at least one embodiment, the handwriting forming method includes following operations.

Step S110: determining a group of plurality of trajectory points according to a plurality of sampling points on a writing path on a working surface of a touch device, and obtaining trajectory information of each of the plurality of trajectory points, in which the trajectory information includes a coordinate, a flag bit and a pressure value, and the flag bit includes data indicating whether a corresponding trajectory point is a pen drop point;

step S120: establishing a plurality of trajectory units in a raindrop shape corresponding to the plurality of trajectory points in one-to-one correspondence based on the trajectory information;

step S130: determining a connection mode between trajectory units corresponding to adjacent trajectory points based on the trajectory information; and step S140: calculating connection points of the trajectory units according to the connection mode, and filling a polygon formed by the connection points of the trajectory units corresponding to the adjacent trajectory points, so as to form a handwriting for displaying.

For example, in step S110, the touch device can be a touch screen, and accordingly, the working surface can be a touch surface of the touch screen to detect touch operations of a user. When the user writes on the working surface of the touch device, different forces can be applied in the process of pen dropping, pen movement, pen ending (or pen raising) and so on, so as to form a writing path, and the touch device can detect a plurality of sampling points distributed along the writing path. For example, when the touch device detects these sampling points, it can obtain the pressure values, coordinates, and flag bits of these sampling points. According to the detected sampling points, the touch device can obtain a group of plurality of trajectory points and trajectory information of the trajectory points. For example, a group of trajectory points include a plurality of trajectory points.

For example, the trajectory information includes a pressure value, a coordinate, and a flag bit. The pressure value indicates how hard a user touches a corresponding trajectory point (corresponding sampling point). For example, the pressure value can be an original pressure value or a pressure value after normalization, and the embodiments of the present disclosure are not limited in this aspect. For example, the pressure value can be detected by a pressure sensor provided in the touch device, and the pressure sensor can include a piezoelectric film to sense the pressure applied to the working surface when the user writes on the working surface of the touch device; or, when the user writes on the working surface of the touch device with a stylus, the stylus can be provided with a pressure sensor, so as to detect the pressure applied to the working surface by the user. The embodiments of the present disclosure do not limit the manner of detecting the pressure value. The coordinate represents the position of the corresponding trajectory point (corresponding sampling point) in the working surface. For example, the coordinate is a coordinate in a Cartesian coordinate system within the working surface, and the origin of the Cartesian coordinate system is determined by the setting of the touch device itself. The flag bit includes data indicating whether the corresponding trajectory point is a pen drop point, the pen drop point is, for example, the first sampling point detected in a continuous writing path. For example, the flag bit can be a preset number, character, string, etc. For example, in some examples, in the case that the corresponding trajectory point is the pen drop point, the flag bit can be set to "down". For example, the flag bit can also include data indicating whether the corresponding trajectory point is a pen ending point and a pen movement point, for example, can be set to "up" and "move-on" respectively. The setting method and setting rules of the flag bit can be determined according to actual needs, and the embodiments of the present disclosure are not limited in this aspect.

It should be noted that in the embodiments of the present disclosure, the pressure value, coordinate, and flag bit in the trajectory information are detected by the touch device, and the acquisition method and expression method of these information can be determined according to the setting of the touch device itself, and the embodiments of the present disclosure are not limited in this aspect. When performing the handwriting forming method provided by the embodiments of the present disclosure, the trajectory information of the trajectory point (that is, the pressure value, coordinate, and flag bit) can be directly acquired from the touch device.

Figure 2A:
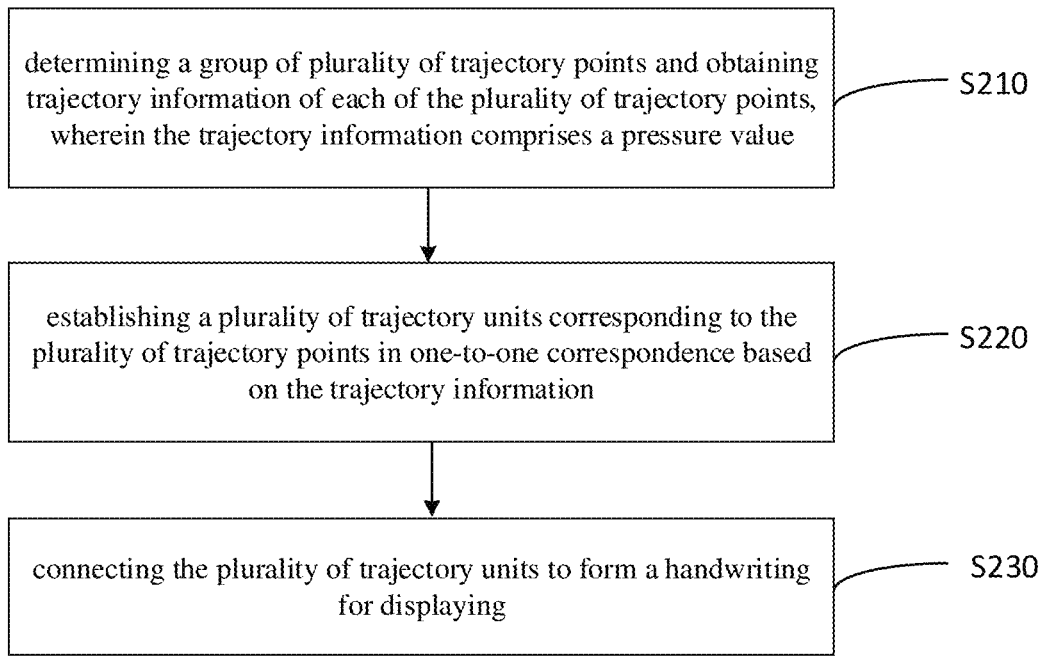
FIG. 2A is a flow diagram of another handwriting forming method provided by at least one embodiment of the present disclosure.

FIG. 2A is a flow diagram of another handwriting forming method provided by at least one embodiment of the present disclosure. As shown in FIG. 2A, in at least one embodiment, the handwriting forming method includes following operations.

Step S210: determining a group of plurality of trajectory points and obtaining trajectory information of each of the plurality of trajectory points, wherein the trajectory information comprises a pressure value;

step S220: establishing a plurality of trajectory units corresponding to the plurality of trajectory points in one-to-one correspondence based on the trajectory information; and step S230: connecting the plurality of trajectory units to form a handwriting for displaying.

For example, in step S210, a group of plurality of trajectory points are determined, and trajectory information of each of the plurality of trajectory points is obtained. For example, the trajectory point may be a sampling point, or may be a fitted interpolating point, such as smooth fitting based on Bezier curve. For example, in step S220, a plurality of trajectory units corresponding to the plurality of trajectory points in one-to-one correspondence based on the trajectory information are established. For example, in step S230, the plurality of trajectory units are connected, so as to form a handwriting which is for displaying.

Figure 2B:
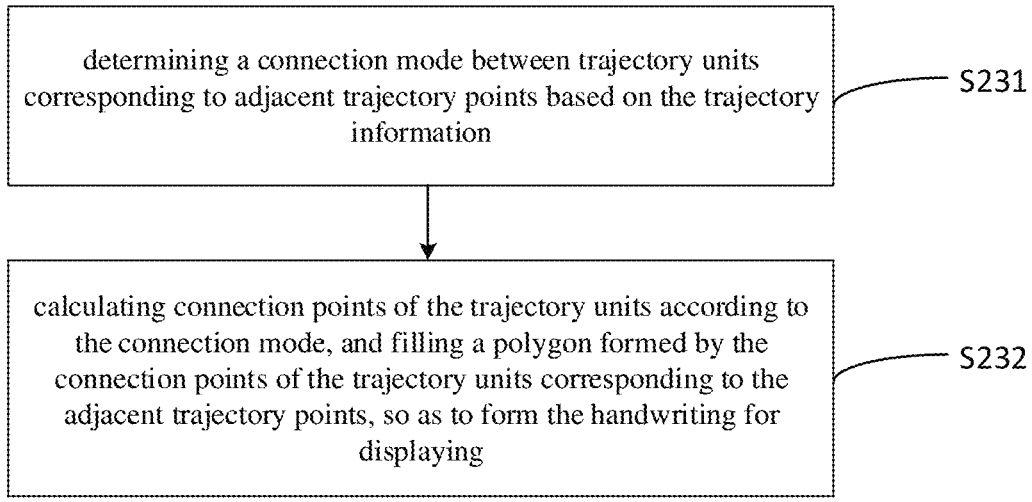
FIG. 2B is a flow diagram of step S230 in the handwriting forming method shown in FIG. 2A.

For example, as shown in FIG. 2B, step S230 may comprises following operations.

Step S231: determining a connection mode between trajectory units corresponding to adjacent trajectory points based on the trajectory information; and step S232: calculating connection points of the trajectory units according to the connection mode, and filling a polygon formed by the connection points of the trajectory units corresponding to the adjacent trajectory points, so as to form the handwriting for displaying.

The detailed description of step S231 and step S232 may be referred to step S130 and step S140.

The trajectory information comprises a pressure value. For example, in some other examples, the trajectory information further comprises a flag bit, and the flag bit comprises data indicating whether a corresponding trajectory point is the pen drop point.

For example, the size of each trajectory unit is determined based on a pressure sensing amount corresponding to the trajectory unit, and the pressure sensing amount is obtained based on the pressure value of a corresponding trajectory point.

The size of the trajectory unit is a maximum distance between two arbitrary points on arbitrary edges of the trajectory unit. For example, the size of the trajectory unit is a radius, an edge length, or a diagonal of the trajectory unit.

In the case where the pressure value of the corresponding trajectory point is less than a first threshold, the pressure sensing amount is a first constant regardless of whether the pressure value of the corresponding trajectory point changes. In the case where the pressure value of the corresponding trajectory point is greater than or equal to a second threshold, the pressure sensing amount is a second constant regardless of whether the pressure value of the corresponding trajectory point changes. In the case where the pressure value of the corresponding trajectory point is no less than the first threshold and is less than the second threshold, the pressure sensing amount increases along with increasing of the pressure value of the corresponding trajectory point.

For example, the first threshold is equal to 0.4, and the first constant is equal to 0.25. For example, the second threshold is equal to 0.8, and the second constant is equal to 1. It should be noted that in the embodiments of the present disclosure, the specific values of the first threshold, first constant, second threshold, and second constant are only exemplary rather than restrictive, and the specific values thereof can be adjusted according to actual needs and can be set to arbitrary values. The embodiments of the present disclosure are not limited in this aspect.

Figure 3A:
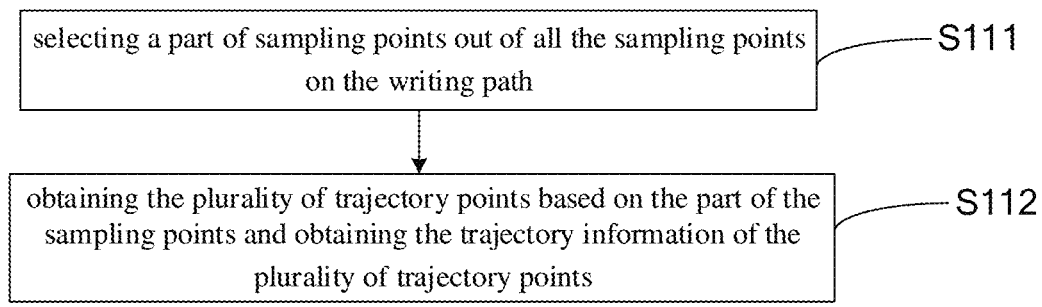
FIG. 3A is a flow diagram of step S110 in the handwriting forming method shown in FIG. 1.

For example, as shown in FIG. 3A, the above step S110 can include the following operations.

Step S111: selecting a part of sampling points out of all the sampling points on the writing path; and step S112: obtaining a plurality of trajectory points based on the part of the sampling points, and obtaining the trajectory information of the plurality of trajectory points.

For example, in step S111, among all the sampling points on a writing path detected by a touch device, a part of the sampling points is selected, that is, all the sampling points are sparsely sampled. For example, in some examples, the ratio of the number of the selected sampling points to the number of all the sampling points ranges from 1% to 5%, for example, 2%. For example, for all the sampling points detected by the touch device, 1-5 sampling points are selected in every 100 sampling points, for example, 2 sampling points are selected. For example, in other examples, the ratio of the number of the selected sampling points to the number of all the sampling points ranges from 1% to 40%. Regarding the ratio of the number of the selected sampling points to the number of all the sampling points, this can be determined according to actual needs, and the embodiments of the present disclosure are not limited in this aspect.

For example, the serial number of the sampling point serving as the pen drop point is 1, and all the sampling points on the writing path are numbered sequentially to form a sequence, and the selected sampling points are relatively evenly distributed in the sequence composed of all the sampling points. Thereby, the number of the sampling points that need to be processed can be greatly reduced by sparse sampling, and the processing efficiency and real-time performance can be improved.

For example, in step S112, trajectory points are obtained based on the sampling points that are selected. For example, in some examples, the selected sampling points can be regarded as the trajectory points, and accordingly, the trajectory information of each of the trajectory points can be obtained from the touch device. For example, in some other examples, the selected sampling points can be smoothed, and after smoothing, the trajectory points and the corresponding trajectory information can be obtained. For example, smoothing processing can adopt usual smoothing processing algorithms and smoothing processing methods, and the embodiments of the present disclosure are not limited in this aspect.

For example, the sampling point is a point obtained by a touch acquisition component in a touch device through touch detection, and the sampling point carries information such as speed, coordinate, and type (for example, whether it is a pen drop point). According to the sampling points provided by the touch device, sparse sampling and interpolation processing are carried out, so that trajectory points can be obtained. For example, sparse sampling has been described above and is not repeated here. For example, the interpolation processing can make the plurality of trajectory points obtained smoother, that is, the interpolation processing can achieve the effect of the smoothing processing described above. When interpolating a certain sampling point, the required parameters include, for example, the information of the other two sampling points adjacent to the sampling point, for example, the information of a sampling point before the sampling point and the information of a sampling point after the sampling point. Thereby, the information of the trajectory point corresponding to the sampling point (for example, speed, coordinate, type, etc.) can be obtained by interpolation calculation. After interpolation processing, a group of trajectory points can be obtained. For example, the type of a trajectory point is the same as the type of a corresponding sampling point, and the speed of a trajectory point is obtained by simulation calculation, for example, by calculating the mean value or numerical difference of the speed of the previous sampling point and the next sampling point. The detailed description about the interpolation processing can refer to the conventional design, which is not repeated here.

For example, as shown in FIG. 1, in step S120, a plurality of trajectory units in a raindrop shape corresponding to a plurality of trajectory points in one-to-one correspondence are established based on the trajectory information, that is, the trajectory unit is established for each of the trajectory points, respectively. A trajectory unit consists of two solid circles with different sizes and the common tangent line of the two circles, and has a shape similar to a raindrop.

Figure 3B:
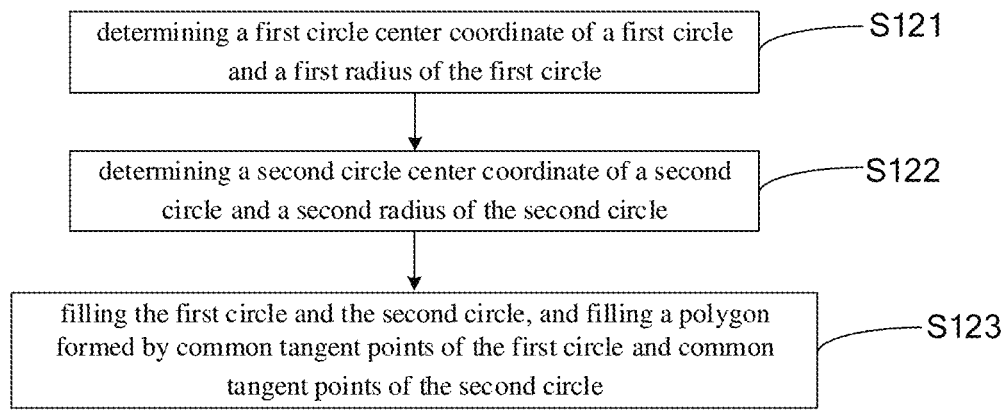
FIG. 3B is a flow diagram of step S120 in the handwriting forming method shown in FIG. 1.

For example, as shown in FIG. 3B, the above step S120 may include the following operations.

Step S121: determining a first circle center coordinate of a first circle and a first radius of the first circle;

step S122: determining a second circle center coordinate of a second circle and a second radius of the second circle; and step S123: filling the first circle and the second circle, and filling a polygon formed by common tangent points of the first circle and common tangent points of the second circle.

The above steps S121-S123 are described below in combination with the trajectory units shown in FIG. 4A and FIG. 4B.

Figure 4A:
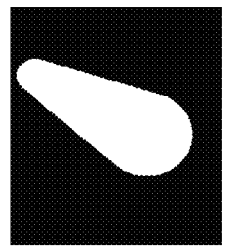
FIG. 4A is a first schematic diagram of a trajectory unit provided by at least one embodiment of the present disclosure.
Figure 4B:
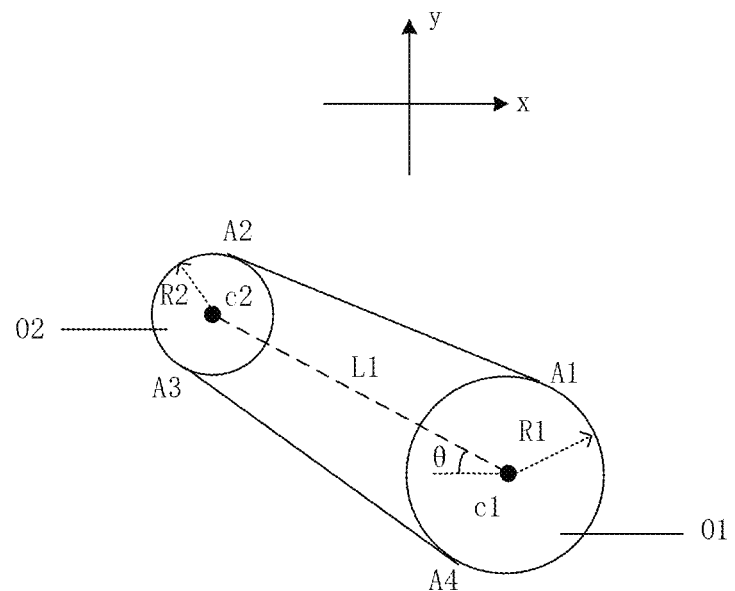
FIG. 4B is a second schematic diagram of the trajectory unit provided by at least one embodiment of the present disclosure.

For example, as shown in FIG. 4A and FIG. 4B, a trajectory unit includes a first circle 01 and a second circle 02. The radius of the first circle 01 is called the first radius R1, and the radius of the second circle 02 is called the second radius R2, and the first radius R1 is greater than the second radius R2, that is, the first circle 01 is a larger circle and the second circle 02 is a smaller circle. The common tangent points of the first circle 01 and the second circle 02 are A1, A2, A3 and A4, and the common tangent lines are $\overline{A1A2}$ and $\overline{A3A4}$. The trajectory unit is composed of the first circle 01, the second circle 02, and the polygon formed by the common tangent points A1, A2, A3 and A4.

For example, in step S121, the coordinate of the circle center c1 of the first circle 01 is called the first circle center coordinate, and the first circle center coordinate is the coordinate of the corresponding trajectory point, for example, the coordinate in the trajectory information can be directly used as the first circle center coordinate.

The first radius R1 is the product of a pressure sensing amount and a plurality of writing parameter preset values. For example, the plurality of writing parameter preset values include a Chinese brush pen diameter and a drawing line width, and accordingly, the first radius R1 is the product of the pressure sensing amount, the Chinese brush pen diameter, and the drawing line width. Different Chinese brush pen diameters and different drawing line widths can make the formed handwriting have different visual effects. For example, the Chinese brush pen diameter and the drawing line width can adopt preset default values or can be set by the user before performing the handwriting forming method, which can be determined according to actual needs, and the embodiments of the present disclosure are not limited in this aspect.

For example, the pressure sensing amount is obtained based on the pressure value of the corresponding trajectory point. Because the force of the user when writing on the touch device is variable, the force may be light or heavy, and only when the sizes of the trajectory units corresponding to the adjacent trajectory points do not change greatly, a relatively beautiful handwriting can be formed. Moreover, the handwriting is usually thinner when a Chinese brush pen is used lightly when writing. Based on the above considerations, the pressure sensing amount is used to establish the trajectory unit, so that the formed handwriting is relatively smooth, and it can also embody the characteristics of the speed of the pen movement. As shown in FIG. 5, the pressure values of a large number of sampling points when different users are writing can be collected through experiments to obtain a large number of pressure value samples, and then a pressure sensing function can be obtained according to the pressure value samples. Here, the pressure value is the data after normalization.

For example, the pressure sensing function can be obtained by adopting statistical methods and combining with simulation optimization processing. For example, the pressure sensing function is as follows:

$$Pz = \begin{cases} 0.25, & P < 0.4 \\ P^2/0.64, & 0.4 \leq P < 0.8 \\ 1, & P \geq 0.8 \end{cases}$$

where Pz represents the pressure sensing amount and P represents the pressure value. After obtaining the pressure sensing function, when performing the handwriting forming method provided by the embodiments of the present disclosure, for any trajectory point, the pressure sensing amount can be calculated based on the pressure value of the trajectory point, so that the change of the pressure sensing amount is relatively gentle. In this case, the above-mentioned first threshold is 0.4, the above-mentioned first constant is 0.25, the above-mentioned second threshold is 0.8, and the above-mentioned second constant is 1.

For example, in some examples, the pressure value provided by the touch device after touch detection is the data after normalization processing, which can be directly substituted into the above formula to obtain the pressure sensing amount. For example, in some other examples, the pressure value provided by the touch device after touch detection is not normalized, and therefore, before calculating the pressure sensing amount, the pressure value provided by the touch device needs to be normalized, and the normalized pressure value is substituted into the above formula to obtain the pressure sensing amount.

For example, the value range of the pressure sensing amount Pz ranges from 0 to 1. In the case that the pressure value P is less than 0.4, the pressure sensing amount is set to a fixed value of 0.25, thereby ensuring a relatively stable pen drop effect when the user is writing. In the case that the pressure value is $0.4 \leq P < 0.8$, by squaring the pressure value P and dividing it by the constant value of 0.64, a more obvious change in the thickness of the pen movement when writing can be made. In the case that the pressure value $P \geq 0.8$, the pressure sensing amount is set to a fixed value of 1, thereby preventing handwriting from suddenly becoming larger and affecting appearance.

It should be noted that in the embodiments of the present disclosure, the above pressure sensing function is only exemplary rather than restrictive, the pressure sensing function can be adjusted according to actual needs, and the embodiments of the present disclosure are not limited in this aspect. For example, each coefficient in the pressure sensing function can be adjusted, such as increasing or decreasing appropriately, the division area of the pressure value P in the pressure sensing function can also be adjusted, and the pressure sensing function can be redesigned and inducted, which can be determined according to actual needs.

For example, in step S122, the coordinate of the circle center c2 of the second circle 02 is called the second circle center coordinate, and the second circle center coordinate is obtained according to the first circle center coordinate, the circle center distance, and the angle of the circle center connection line. For example, the circle center distance is the distance between the circle center c1 of the first circle 01 and the circle center c2 of the second circle 02. The circle center distance is Q times of the product of the brush length and the pressure value of the corresponding trajectory point, and $2 \leq Q \leq 7$. For example, the brush length can adopt the preset default value, or it can be set by the user before performing the handwriting forming method, which can be determined according to actual needs, and the embodiments of the present disclosure are not limited in this aspect. For example, the angle of the circle center connection line is the angle $\theta$ between the connection line L1 between the circle center c1 of the first circle 01 and the circle center c2 of the second circle 02 and an x-axis direction of a coordinate system where the first circle center coordinate is located. Here, the angle $\theta$ is an acute angle, and is the angle between the connection line L1 and the negative direction of x-axis. Because the first circle center coordinate is the coordinate of the corresponding trajectory point, which is provided by the touch device, and therefore, the coordinate system where the first circle center coordinate is located is the coordinate system defined by the touch device and located on the working surface. For example, the angle of the circle center connection line ranges from 15 to 60 degrees, for example, from 20 to 45 degrees, or may be 30 degrees. On the premise of knowing the first circle center coordinate, the circle center distance and the angle of the circle center connection line, the second circle center coordinate can be obtained by using the knowledge of plane geometry.

For example, in some examples, $4.5 \leq Q \leq 5.5$, and the angle of the circle center connection line ranges from 25 to 35 degrees. For example, in some other examples, Q=5, and the angle of the circle center connection line is 30 degrees, thereby the handwriting formed by the trajectory unit that is obtained is more beautiful.

For example, the second radius R2 is calculated according to the following formula: R2=0.5*R1*t. Here, t represents ink density, and t=max(0.8*T/n, 0.6). For example, T is a constant and can be set to 0.8. The alphabet "n" is a serial number of the trajectory point. For example, the serial number of the trajectory point serving as the pen drop point is 1, and subsequent trajectory points are numbered as 2, 3, 4, etc. It should be noted that in the embodiments of the present disclosure, the above formula for calculating the ink density t is exemplary rather than restrictive, and can be adjusted according to actual needs, and the embodiments of the present disclosure are not limited in this aspect.

For example, in step S123, on the premise of knowing the first circle center coordinate, the first radius R1, the second circle center coordinate and the second radius R2, the common tangent points A1, A2, A3 and A4 of the first circle 01 and the second circle 02 can be obtained by calculating, and then the first circle 01, the second circle 02, and the polygon formed by the common tangent points A1, A2, A3 and A4 are filled, so as to obtain the trajectory unit corresponding to the trajectory point.

For example, as shown in FIG. 1, in step S130, the connection mode between the trajectory units corresponding to the adjacent trajectory points is determined based on the trajectory information. To embody different strokes and make handwriting more beautiful, different connection modes for the trajectory units corresponding to the trajectory points in different strokes are adopted according to the characteristics of the strokes. It should be noted that "adjacent" does not mean that the positions of two trajectory points on the working surface of the touch device are adjacent, but means that the two trajectory points are adjacent in the sequence composed of a group of trajectory points that are sequentially numbered and obtained based on a plurality of sampling points on the writing path, that is, the serial numbers of the two trajectory points are adjacent. For example, the trajectory point with serial number 1 is adjacent to the trajectory point with serial number 2. For example, the trajectory point with serial number 4 is not only adjacent to the trajectory point with serial number 5, but also adjacent to the trajectory point with serial number 3.

For example, as shown in FIG. 6, the above step S130 may include the following operations.

Step S131: for trajectory points other than the pen drop point, calculating the slope of the connection line between the current trajectory point and the previous trajectory point; and step S132: according to the slope, the coordinate of the current trajectory point, and the coordinate of the previous trajectory point, determining the connection mode adopted by the trajectory unit corresponding to the current trajectory point.

For example, in step S131, the slope can be obtained by calculating according to the following formula:

$$k = \frac{y2 - y1}{x2 - x1},$$

where k represents the slope, (x2, y2) represents the coordinate of the current trajectory point, and (x1, y1) represents the coordinate of the previous trajectory point.

For example, in step S132, the above connection modes include a first connection mode, a second connection mode, a third connection mode, and a fourth connection mode. For example, in some examples, the first connection mode corresponds to the "horizontal" stroke, the second connection mode corresponds to the "right-falling" stroke, the third connection mode corresponds to the "raising" stroke, and the fourth connection mode corresponds to other strokes except the above three strokes. By dividing different connection modes, the handwriting formed by the handwriting forming method can be more in line with the writing characteristics of different strokes and more beautiful.

According to the slope k, the coordinate (x2, y2) of the current trajectory point and the coordinate (x1, y1) of the previous trajectory point, the following rules can be adopted to determine the connection mode adopted by the trajectory unit corresponding to the current trajectory point.

Figure 7A:
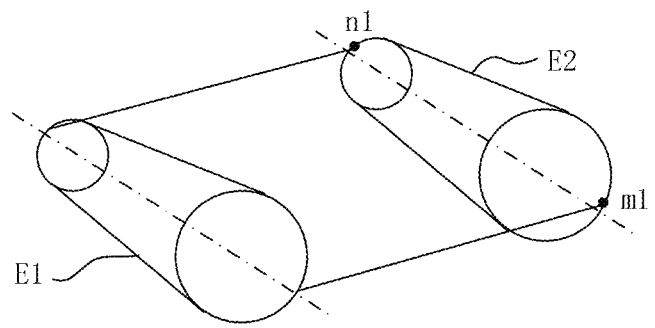
FIG. 7A is a schematic diagram of a first connection mode provided by at least one embodiment of the present disclosure.

In the case where $|k| \le 0.6$ or $|x2-x1| < 1$, it is determined that the trajectory unit corresponding to the current trajectory point adopts the first connection mode, and the first connection mode is, for example, the connection mode shown in FIG. 7A, that is, the connection mode corresponding to the "horizontal" stroke. In the case where $-0.9 < k < -0.6$ and $x2 > x1$, it is determined that the trajectory unit corresponding to the current trajectory point adopts the second connection mode, and the second connection mode is, for example, the connection mode shown in FIG. 7B, that is, the connection mode corresponding to the "right-falling" stroke. In the case where $0.6 < k < 1$ and $y2 < y1$, it is determined that the trajectory unit corresponding to the current trajectory point adopts the third connection mode, and the third connection mode is, for example, the connection mode shown in FIG. 7C, that is, the connection mode corresponding to the "raising" stroke. Otherwise, it is determined that the trajectory unit corresponding to the current trajectory point adopts the fourth connection mode, and the fourth connection mode is, for example, the connection mode shown in FIG. 7D, that is, the connection mode corresponding to other strokes except the above three strokes.

For example, when determining the connection mode, it can be judged in order according to the above contents. That is to say, first, it is judged whether the conditions for adopting the first connection mode are satisfied; if not, then it is judged whether the conditions for adopting the second connection mode are satisfied; if still not, then it is judged whether the conditions for adopting the third connection mode are satisfied; if yet still not, the fourth connection mode is adopted.

It should be noted that the above rules for determining the connection mode are exemplary rather than restrictive, the above rules for determining the connection mode can be adjusted according to the actual needs, and the embodiments of the present disclosure are not limited in this aspect.

It should be noted that for the trajectory point serving as the pen drop point (the trajectory point with serial number 1, that is, the first trajectory point on a continuous writing path), there is no need to determine the connection mode of the trajectory unit corresponding to the trajectory point, and how to determine the connection points of the trajectory unit corresponding to the trajectory point will be described hereinafter, which is not repeated here.

For example, as shown in FIG. 1, in step S140, after determining the connection mode, the connection points of the trajectory unit are calculated according to the connection mode, and the polygon formed by the connection points of the trajectory units corresponding to the adjacent trajectory points is filled, so as to form the handwriting for displaying.

Figure 8:
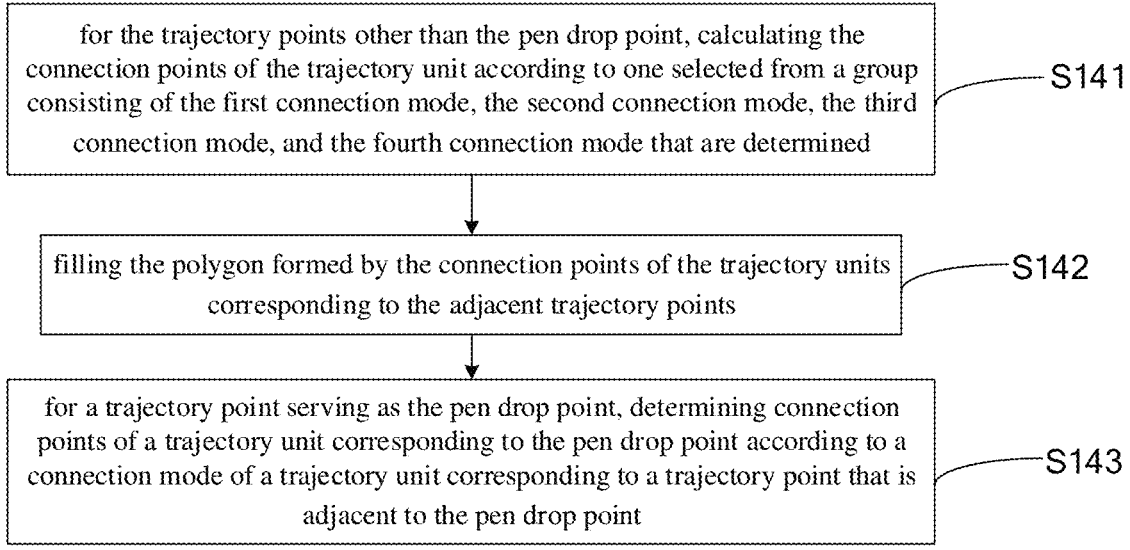
FIG. 8 is a first flow diagram of step S140 in the handwriting forming method shown in FIG. 1.

For example, as shown in FIG. 8, the above step S140 may include the following operations.

Step S141: for the trajectory points other than the pen drop point, calculating the connection points of the trajectory unit according to one selected from the group consisting of the first connection mode, the second connection mode, the third connection mode and the fourth connection mode that are determined;

step S142: filling the polygon formed by the connection points of the trajectory units corresponding to the adjacent trajectory points; and step S143: for the trajectory point serving as the pen drop point, determining the connection points of the trajectory unit corresponding to the pen drop point according to the connection mode of the trajectory unit corresponding to the trajectory point that is adjacent to the pen drop point.

For example, in step S141, according to different connection modes, different formulas are adopted to calculate the connection points of the trajectory unit, and the calculated connection points are used to subsequently fill the area between adjacent trajectory units. The method for calculating the connection points is described in detail in combination with the connection mode shown in FIGS. 7A-7D.

For example, as shown in FIG. 7A, in the case that the trajectory unit E2 corresponding to the current trajectory point adopts the first connection mode, the connection points of the trajectory unit E2 include a first connection point m1 and a second connection point n1. The first connection point m1 and the second connection point n1 are calculated according to the following formula:

$$\begin{cases} m \cdot x = \text{floor}(c1 \cdot x - R1^* \cos \theta) \\ m \cdot y = \text{floor}(c1 \cdot y - R1^* \sin \theta) \\ n \cdot x = c2 \cdot x + R2^* \cos \theta \\ n \cdot y = \text{floor}(c2 \cdot y + R2) \end{cases},$$

where (m.x, m.y) represents the coordinate of the first connection point m1, (n.x, n.y) represents the coordinate of the second connection point n1, (c1.x, c1.y) represents the first circle center coordinate in the trajectory unit E2, (c2.x, c2.y) represents the second circle center coordinate in the trajectory unit E2, R1 represents the first radius of the trajectory unit E2, R2 represents the second radius of the trajectory unit E2, and θ represents the angle of the circle center connection line in the trajectory unit E2. For example, the coordinate of the first connection point m1, the coordinate of the second connection point n1, the first circle center coordinate and the second circle center coordinate are located in the same coordinate system on the working surface of the touch device. In the above formula, "floor" means rounding down.

For example, the first connection mode corresponds to the "horizontal" stroke, and the part between the trajectory unit E2 corresponding to the current trajectory point and the trajectory unit E1 corresponding to the previous trajectory point is a line segment in the "horizontal" stroke. The first connection point m1 and the second connection point n1 calculated by adopting the above modes are used for subsequent filling, which can make the formed handwriting more in line with the writing characteristics of the "horizontal" stroke.

Figure 7B:
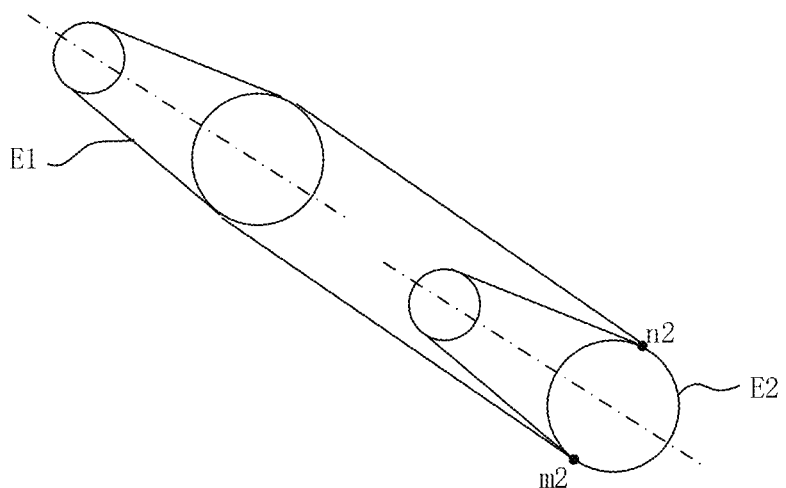
FIG. 7B is a schematic diagram of a second connection mode provided by at least one embodiment of the present disclosure.

For example, as shown in FIG. 7B, in the case that the trajectory unit E2 corresponding to the current trajectory point adopts the second connection mode, the connection points of the trajectory unit E2 include the first connection point m2 and the second connection point n2. The first connection point m2 and the second connection point n2 are calculated according to the following formula:

$$\begin{cases} m \cdot x = c2 \cdot x - R1 \\ m \cdot y = \text{floor}(c2 \cdot y - R2) - 2 \\ n \cdot x = c2 \cdot x - R1 \\ n \cdot y = \text{ceil}(c2 \cdot y + R2) + 1 \end{cases},$$

where (m.x, m.y) represents the coordinate of the first connection point m2, (n.x, n.y) represents the coordinate of the second connection point n2, (c2.x, c2.y) represents the second circle center coordinate in the trajectory unit E2, R1 represents the first radius in the trajectory unit E2, and R2 represents the second radius in the trajectory unit E2. For example, the coordinate of the first connection point m2, the coordinate of the second connection point n2, and the second circle center coordinate are located in the same coordinate system on the working surface of the touch device. In the above formula, "floor" means rounding down and "ceil" means rounding up.

For example, the second connection mode corresponds to the "right-falling" stroke, and the part between the trajectory unit E2 corresponding to the current trajectory point and the trajectory unit E1 corresponding to the previous trajectory point is a line segment in the "right-falling" stroke. The first connection point m2 and the second connection point n2 calculated by adopting the above modes are used for subsequent filling, which can make the formed handwriting more in line with the writing characteristics of the "right-falling" stroke.

Figure 7C:
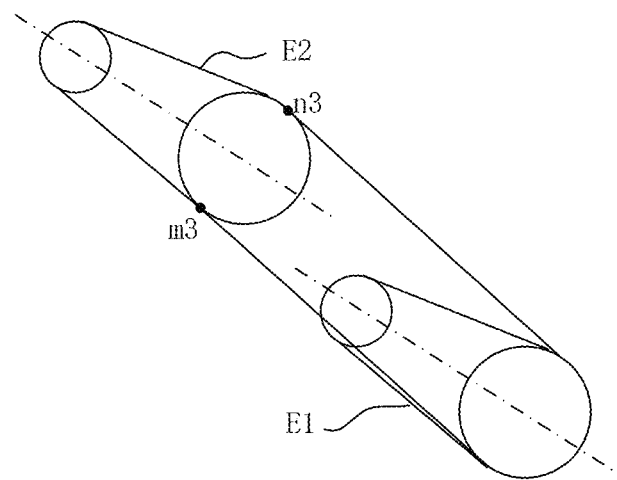
FIG. 7C is a schematic diagram of a third connection mode provided by at least one embodiment of the present disclosure.

For example, as shown in FIG. 7C, in the case that the trajectory unit E2 corresponding to the current trajectory point adopts the third connection mode, the connection points of the trajectory unit E2 include a first connection point m3 and a second connection point n3. The first connection point m3 and the second connection point n3 are calculated according to the following formula:

$$\begin{cases} m \cdot x = c2 \cdot x \\ m \cdot y = \text{floor}(c2 \cdot y - R2) \\ n \cdot x = c2 \cdot x \\ n \cdot y = \text{ceil}(c2 \cdot y + R2) \end{cases},$$

where (m.x, m.y) represents the coordinate of the first connection point m3, (n.x, n.y) represents the coordinate of the second connection point n3, (c2.x, c2.y) represents the second circle center coordinate in the trajectory unit E2, and R2 represents the second radius in the trajectory unit E2. For example, the coordinate of the first connection point m3, the coordinate of the second connection point n3, and the second circle center coordinate are located in the same coordinate system on the working surface of the touch device. Similarly, in the above formula, "floor" means rounding down and "ceil" means rounding up.

For example, the third connection mode corresponds to the "raising" stroke, and the part between the trajectory unit E2 corresponding to the current trajectory point and the trajectory unit E1 corresponding to the previous trajectory point is a line segment in the "raising" stroke. The first connection point m3 and the second connection point n3 calculated by adopting the above modes are used for subsequent filling, which can make the formed handwriting more in line with the writing characteristics of the "raising" stroke.

Figure 7D:
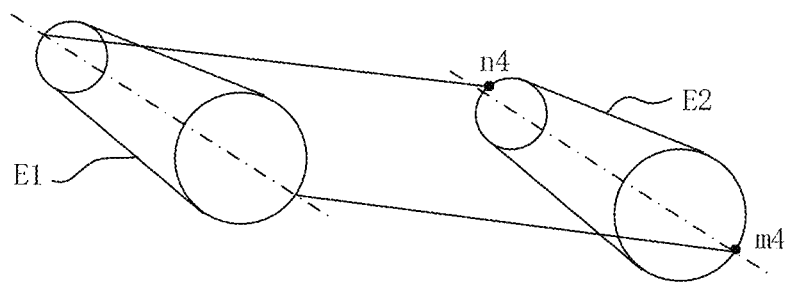
FIG. 7D is a schematic diagram of a fourth connection mode provided by at least one embodiment of the present disclosure.

For example, as shown in FIG. 7D, in the case that the trajectory unit E2 corresponding to the current trajectory point adopts the fourth connection mode, the connection points of the trajectory unit E2 include a first connection point m4 and a second connection point n4. The first connection point m4 and the second connection point n4 are calculated according to the following formula:

$$\begin{cases} m \cdot x = \text{floor}(c1 \cdot x - R1^* \cos \theta) \\ m \cdot y = \text{floor}(c1 \cdot y - R1^* \sin \theta) \\ n \cdot x = \text{ceil}(c2 \cdot x + R2^* \cos \theta) \\ n \cdot y = \text{floor}(c2 \cdot y + R2) - 1 \end{cases},$$

where (m.x, m.y) represents the coordinate of the first connection point m4, (n.x, n.y) represents the coordinate of the second connection point n4, (c1.x, c1.y) represents the first circle center coordinate in the trajectory unit E2, (c2.x, c2.y) represents the second circle center coordinate in the trajectory unit E2, R1 represents the first radius of the trajectory unit E2, R2 represents the second radius of the trajectory unit E2, and $\theta$ represents the angle of the circle center connection line in the trajectory unit E2. For example, the coordinate of the first connection point m4, the coordinate of the second connection point n4, the first circle center coordinate and the second circle center coordinate are located in the same coordinate system on the working surface of the touch device. Similarly, in the above formula, "floor" means rounding down and "ceil" means rounding up.

For example, the fourth connection mode corresponds to other strokes except the above-described three strokes, and the part between the trajectory unit E2 corresponding to the current trajectory point and the trajectory unit E1 corresponding to the previous trajectory point is a line segment in the stroke. The first connection point m4 and the second connection point n4 calculated by adopting the above modes are used for subsequent filling, which can make the formed handwriting have better coherence and is suitable for forming a plurality of strokes.

It should be noted that in the embodiments of the present disclosure, the formulas for calculating the connection points adopted respectively by the first connection mode, the second connection mode, the third connection mode, and the fourth connection mode are only exemplary rather than restrictive, the above formulas can be adjusted according to actual needs, and the embodiments of the present disclosure are not limited in this aspect.

For example, after the connection points of the trajectory unit corresponding to each of the trajectory points are calculated, the polygon formed by the connection points of the trajectory units corresponding to the adjacent trajectory points is filled, thereby making the plurality of trajectory units corresponding to the plurality of trajectory points form continuous handwriting between each other.

For example, in the first connection mode shown in FIG. 7A, the first connection point m1 and the second connection point n1 are two adjacent vertices of the polygon (for example, a quadrilateral) between the trajectory unit E2 and the trajectory unit E1, and the other two vertices of the polygon are two connection points on the trajectory unit E1. Filling the polygon can make continuous handwriting formed between the trajectory unit E2 and the trajectory unit E1. For example, in the second connection mode shown in FIG. 7B, the first connection point m2 and the second connection point n2 are two adjacent vertices of the polygon (for example, a quadrilateral) between the trajectory unit E2 and the trajectory unit E1, and the other two vertices of the polygon are two connection points on the trajectory unit E1. Filling the polygon can make continuous handwriting formed between the trajectory unit E2 and the trajectory unit E1. In the third connection mode shown in FIG. 7C and the fourth connection mode shown in FIG. 7D, the filling of the polygon adopts a similar mode, which is not repeated here.

For example, as shown in FIG. 8, in step S143, for the trajectory point serving as the pen drop point, the connection points of the trajectory unit corresponding to the pen drop point is determined according to the connection mode of the trajectory unit corresponding to the trajectory point adjacent to the pen drop point. For example, the serial number of the trajectory point serving as the pen drop point is 1, and thus the connection points of the trajectory unit corresponding to the pen drop point is determined according to the connection mode of the trajectory unit corresponding to the trajectory point with serial number 2, thereby a polygon can be formed and filled between the trajectory unit corresponding to the pen drop point and the trajectory unit corresponding to the trajectory point with serial number 2.

In the case where the connection mode of the trajectory unit corresponding to the trajectory point adjacent to the pen drop point (i.e. the trajectory point with serial number 2) is the first connection mode, the second connection mode or the third connection mode, the connection mode of the trajectory unit corresponding to the trajectory point adjacent to the pen drop point (i.e. the trajectory point with serial number 2) is adopted to determine the connection points of the trajectory unit corresponding to the pen drop point. For example, in some examples, in the case that the connection mode of the trajectory unit corresponding to the trajectory point with serial number 2 is the first connection mode, the first connection mode is adopted to calculate the connection points of the trajectory unit corresponding to the pen drop point, that is, the formula corresponding to the aforementioned first connection mode is adopted to calculate the first connection point and the second connection point of the trajectory unit corresponding to the pen drop point. In the case that the connection mode of the trajectory unit corresponding to the trajectory point with serial number 2 is the second connection mode or the third connection mode, the second connection mode or the third connection mode is adopted to calculate the connection points of the trajectory unit corresponding to the pen drop point, that is, the formula corresponding to the aforementioned second connection mode or the third connection mode is adopted to calculate the first connection point and the second connection point of the trajectory unit corresponding to the pen drop point, which may not be repeated here.

In the case where the connection mode of the trajectory unit corresponding to the trajectory point adjacent to the pen drop point (i.e., the trajectory point with serial number 2) is the fourth connection mode, the first connection point m5 and the second connection point n5 of the trajectory unit corresponding to the pen drop point is calculated according to the following formula:

$$\begin{cases} m \cdot x = c1 \cdot x \\ m \cdot y = c1 \cdot y + R1 \\ n \cdot x = c2 \cdot x + R2^* \cos \theta \\ n \cdot y = c2 \cdot y + R2^* \sin \theta + 1 \end{cases},$$

where (m.x, m.y) represents the coordinate of the first connection point m5, (n.x, n.y) represents the coordinate of the second connection point n5, (c1.x, c1.y) represents the first circle center coordinate of the trajectory unit corresponding to the pen drop point, (c2.x, c2.y) represents the second circle center coordinate of the trajectory unit corresponding to the pen drop point, R1 represents the first radius of the trajectory unit corresponding to the pen drop point, R2 is the second radius of the trajectory unit corresponding to the pen drop point, and θ represents the angle of the circle center connection line of the trajectory unit corresponding to the pen drop point. For example, the coordinate of the first connection point m5, the coordinate of the second connection point n5, the first circle center coordinate and the second circle center coordinate are located in the same coordinate system on the working surface of the touch device. In the case that the first connection point m5 and the second connection point n5 are used for subsequent filling, it can have a better pen drop shape and make the handwriting more beautiful.

Through the above methods, after the connection points of the trajectory unit corresponding to each of the trajectory points are calculated, the connection points of the trajectory unit corresponding to any two adjacent trajectory points can form a polygon (for example, the connection points can serve as vertices to form a quadrangle), and these polygons are filled, so that a coherent handwriting can be formed between the plurality of trajectory units.

Figure 9:
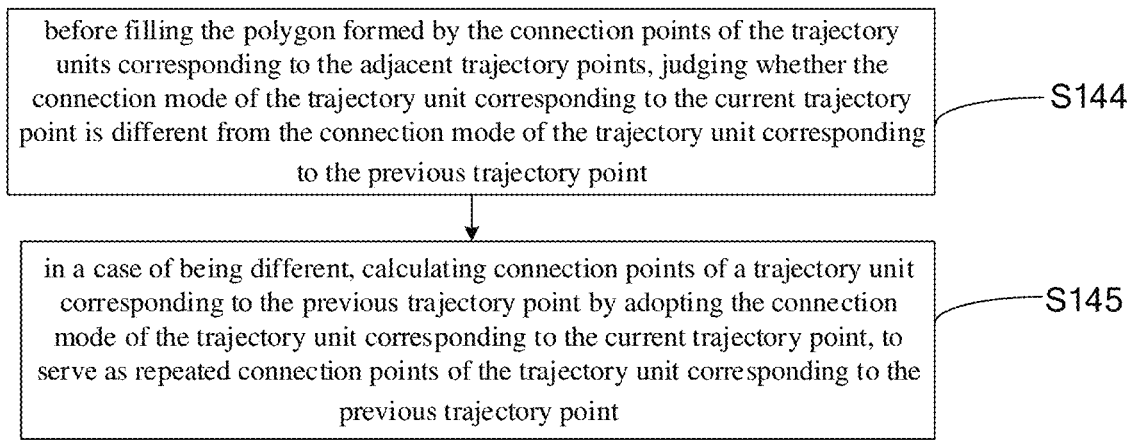
FIG. 9 is a second flow diagram of step S140 in the handwriting forming method shown in FIG. 1.

In the case that two different strokes are connected, because the connection modes corresponding to different strokes are different, there may be gaps at the connection position, which affects the aesthetics of the handwriting. In order to eliminate the gaps between different strokes, as shown in FIG. 9, in at least one embodiment, in addition to the above steps S141-S143, step S140 in FIG. 1 may further include the following operations.

Step S144: before filling the polygon formed by the connection points of the trajectory units corresponding to the adjacent trajectory points, judging whether the connection mode of the trajectory unit corresponding to the current trajectory point is different from the connection mode of the trajectory unit corresponding to the previous trajectory point; and step S145: in the case of being different, calculating the connection points of the trajectory unit corresponding to the previous trajectory point by adopting the connection mode of the trajectory unit corresponding to the current trajectory point, to serve as the repeated connection points of the trajectory unit corresponding to the previous trajectory point.

For example, when filling the polygon formed by the connection points of the trajectory units corresponding to the adjacent trajectory points, the polygon between the trajectory unit corresponding to the previous trajectory point and the trajectory unit corresponding to the current trajectory point is formed based on the repeated connection points.

Figure 10:
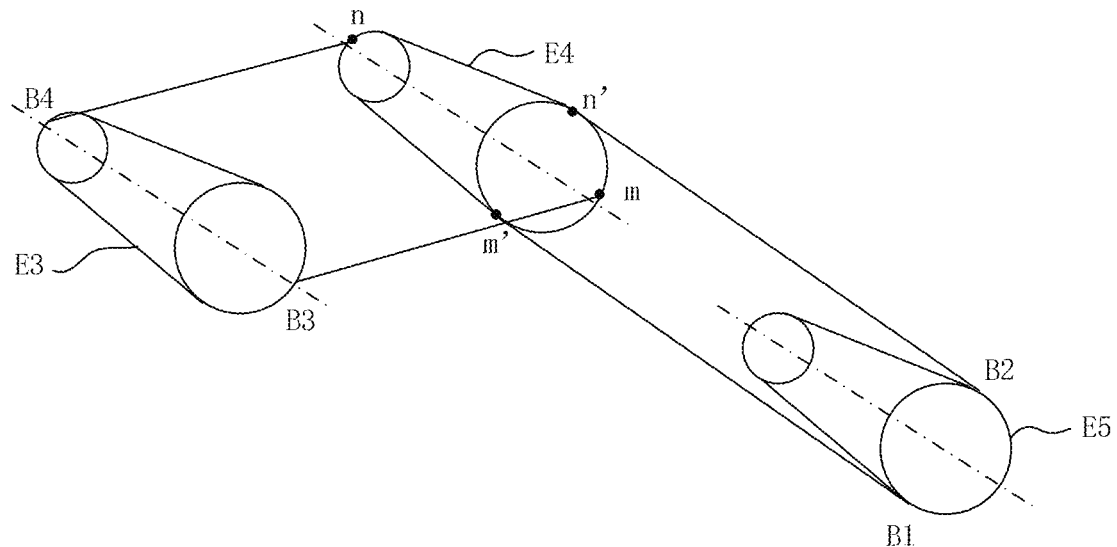
FIG. 10 is a model connection diagram of different connection modes provided by at least one embodiment of the present disclosure.

FIG. 10 is a schematic diagram of the model connection of different connection modes provided by at least one embodiment of the present disclosure. The above steps S144 and S145 are described below in combination with FIG. 10.

For example, as shown in FIG. 10, the three trajectory units E3, E4 and E5 are respectively the trajectory units corresponding to three adjacent trajectory points, and these three trajectory points are respectively, for example, three trajectory points with serial numbers of 3, 4 and 5. In the description hereinafter, these three trajectory points are respectively called trajectory point 3, trajectory point 4 and trajectory point 5, and accordingly, these three trajectory units are respectively called trajectory unit E3, trajectory unit E4 and trajectory unit E5.

For example, according to the slope of the connection line between the trajectory point 4 and the trajectory point 3, the coordinate of the trajectory point 4 and the coordinate of the trajectory point 3, it is determined that the trajectory unit E4 corresponding to the trajectory point 4 adopts the first connection mode, so as to obtain the two connection points m and n of the trajectory unit E4 by calculating. According to the slope of the connection line between the trajectory point 5 and the trajectory point 4, the coordinate of the trajectory point 5 and the coordinate of the trajectory point 4, it is determined that the trajectory unit E5 corresponding to the trajectory point 5 adopts the second connection mode, so as to obtain the two connection points B1 and B2 of the trajectory unit E5 by calculating. The two connection points B3 and B4 of the trajectory unit E3 can be obtained by calculating according to the trajectory point 3 and the trajectory point 2 (not shown in the figure), and the trajectory unit E3 adopts the first connection mode, for example.

Before filling the polygon formed by the connection point m and connection point n of the trajectory unit E4 and the connection points B3 and B4 of the trajectory unit E3, it is judged whether the connection mode of the trajectory unit E4 is different from the connection mode of the trajectory unit E3. In this example, the connection mode of the trajectory unit E4 is the same as the connection mode of the trajectory unit E3, which are both the first connection mode, and therefore, the polygon formed by connection points m, n, B3 and B4 is filled.

Before filling the polygon formed by the connection points B1 and B2 of the trajectory unit E5 and the connection points m and n of the trajectory unit E4, it is judged whether the connection mode of the trajectory unit E5 is different from the connection mode of the trajectory unit E4. In this example, the connection mode of the trajectory unit E5 is different from the connection mode of the trajectory unit E4, and the connection mode of the trajectory unit E5 is the second connection mode, while the connection mode of the trajectory unit E4 is the first connection mode. Therefore, it is needed to adopt the connection mode of the trajectory unit E5 (i.e., the second connection mode) to calculate the connection points of the trajectory unit E4 again, and obtain the connection points m' and n', which are called the repeated connection points of the trajectory unit E4.

Thereby, the trajectory unit E4 has not only the connection points m and n, but also the repeated connection points m' and n'. The polygon between the trajectory unit E4 and the trajectory unit E5 is formed based on the repeated connection points m' and n', while the polygon between the trajectory unit E4 and the trajectory unit E3 is formed based on the connection points m and n, and therefore, the handwriting formed after filling can have no gap at the connection position (i.e., the position of the trajectory unit E4), so that different strokes can be connected continuously and transitioned smoothly, thereby improving the aesthetics of the handwriting.

For example, in at least one embodiment, before establishing a plurality of trajectory units in a raindrop shape, the handwriting forming method can further include an operation for realizing a pen edge effect, and the operation is as follows.

Step S160: selecting continuous Z trajectory points including the pen drop point, adding a compensation value to the pressure value in the trajectory information of each of the Z trajectory points to obtain an updated pressure value, and replacing the pressure value in the trajectory information with the updated pressure value.

For example, in at least one embodiment, before establishing the plurality of trajectory units, the handwriting forming method can further include an operation for realizing a pen edge effect, and the operation is as follows.

Step S240: performing compensation on the pressure value in the trajectory information.

For example, in step S240, compensation is performed on the pressure value before the pressure value is used to calculate the pressure sensing amount. After the compensation is performed, the updated pressure value is used to calculate the pressure sensing amount, and the pressure sensing amount is further used to determine the size of the trajectory unit.

Figure 2C:
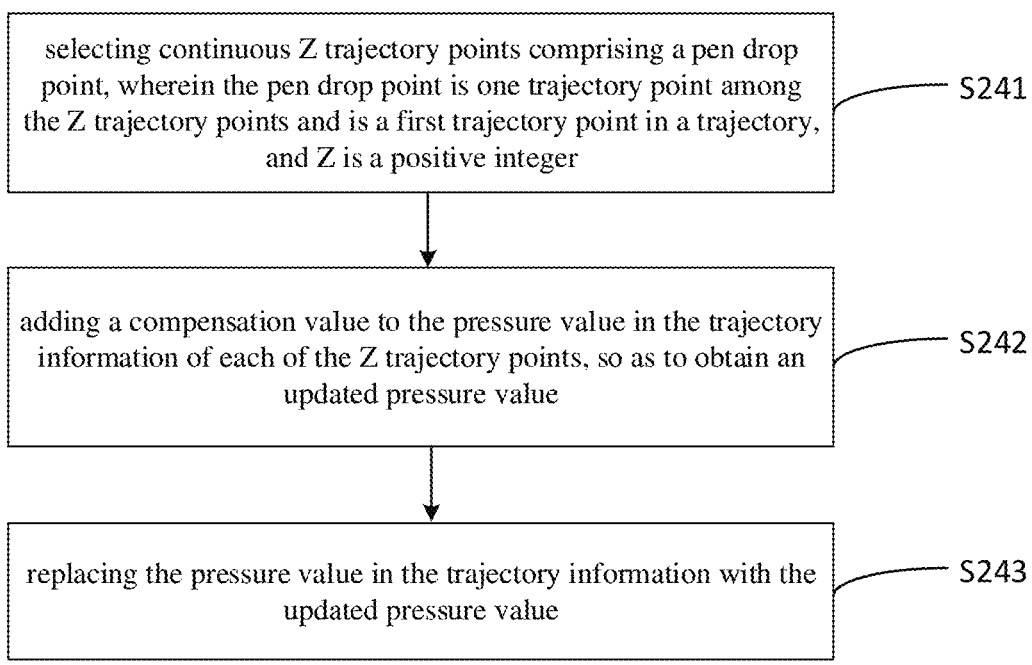
FIG. 2C is a flow diagram of step S240 in the handwriting forming method provided by at least one embodiment of the present disclosure.

For example, as shown in FIG. 2C, the above step S240 may include the following operations.

Step S241: selecting continuous Z trajectory points comprising a pen drop point, wherein the pen drop point is one trajectory point among the Z trajectory points and is a first trajectory point in a trajectory, and Z is a positive integer;

step S242: adding a compensation value to the pressure value in the trajectory information of each of the Z trajectory points, so as to obtain an updated pressure value; and step S243: replacing the pressure value in the trajectory information with the updated pressure value.

For example, in step S241, continuous Z trajectory points are selected. One trajectory point of the Z trajectory points is a pen drop point. The pen drop point is one trajectory point among the Z trajectory points. The pen drop point is a first trajectory point in a trajectory. Z is a positive integer.

For example, in step S242, a compensation value is added to the pressure value. The pressure value of each of the Z trajectory points needs to be added by a corresponding compensation value, so as to obtain an updated pressure value of each of the Z trajectory points.

For example, in step S243, the pressure value in the trajectory information is replaced with the updated pressure value. The updated pressure value is used to calculate the pressure sensing amount, and the pressure sensing amount is further used to determine the size of the trajectory unit.

In this way, compensation for the pressure value is realized, thereby realizing a pen edge effect.

For example, $5 \leq Z \leq 15$ and Z is an integer. For example, in some examples, $Z=9$. For example, Z compensation values corresponding to the Z trajectory points are successively reduced.

When the user drops the pen during the writing process, the pen edge effect helps to improve the aesthetics of the handwriting, and the trajectory unit corresponding to a single trajectory point is not enough to show a full pen drop. Because the pressure value when dropping the pen is usually small, in step S160, the pressure values corresponding to the Z continuous trajectory points including the pen drop point are compensated, and then the compensated pressure values are used to establish the trajectory unit and perform subsequent processing, thereby forming a stable and full pen drop, so as to form pen edge effect. For example, the Z compensation values corresponding to the above Z trajectory points decrease in turn. In addition, in the aforementioned pressure sensing formula, in the case that the pressure value is less than 0.4, the pressure sensing amount is equal to the constant of 0.25, which also helps to obtain the pen edge effect.

For example, in some examples, in the case of Z=9, the pressure values corresponding to nine continuous trajectory points including the pen drop point (that is, the nine trajectory points including the pen drop point) are added with the compensation values of 0.3, 0.23, 0.2, 0.17, 0.15, 0.1, 0.08, 0.04, and 0.01, respectively. After obtaining the updated pressure values, the pressure values in the trajectory information are replaced with the updated pressure values, and then subsequent operations such as establishing the trajectory unit are performed based on the trajectory information. In this way, the trajectory units corresponding to the nine trajectory points are decreased in turn, and by filling the polygon between the trajectory units, a full pen drop can be formed, which has beautiful pen edge effect.

It should be noted that in the embodiments of the present disclosure, the specific value of the compensation value used for the pen edge processing is not limited, and the compensation value in the above example is only exemplary rather than restrictive, which can be determined according to actual needs, and only needs to allow the plurality of compensation values to decrease in turn, and the embodiments of the present disclosure are not limited in this aspect. The number of the trajectory points used for the pen edge processing is also unlimited, which can be determined according to actual needs, for example, according to the pen edge effect that is required to be achieved.

For example, in at least one embodiment, the handwriting forming method can further include the following operations.

Step S170: performing an anti-aliasing treatment on the edge lines of a filled pattern.

In some display devices, due to the characteristics of raster graphics display, for non-horizontal and non-vertical lines or polygonal boundaries, there may be a jagged or stepped appearance, thereby forming edge burr. The information distortion after reconstruction due to insufficient sampling caused by such discrete sampling is called aliasing. In order to improve the aesthetics, an anti-aliasing treatment can be performed on the edge lines of the filled pattern, thereby reducing or eliminating the edge burr of the lines.

For example, the above step S170 can be performed simultaneously with the step S120 shown in FIG. 1 or after the step S120, so as to eliminate burrs at the boundaries of the trajectory unit. For another example, the above step S170 can be performed simultaneously with the step S140 shown in FIG. 1 or after the step S140, so as to eliminate burrs at the boundaries of the polygon between the trajectory units. For still another example, the above step S170 can be performed before displaying the handwriting with the display device, so as to eliminate the edge burrs in the handwriting completely. Regarding the execution way and execution time of the above step S170, the embodiments of the present disclosure are not limited in this aspect.

Figure 11:
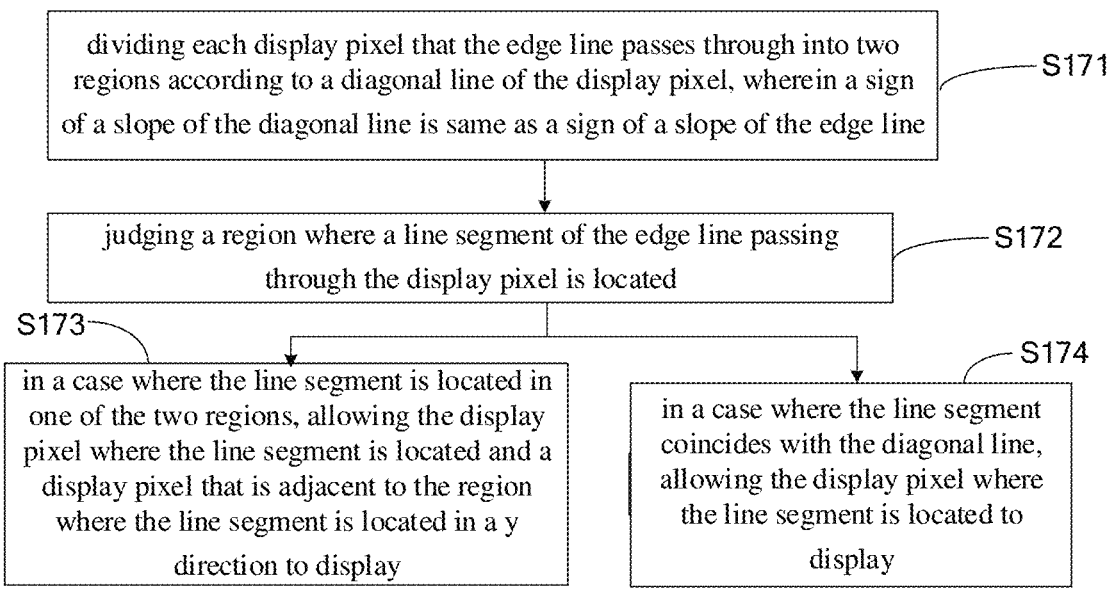
FIG. 11 is a flow diagram of anti-aliasing treatment provided by at least one embodiment of the present disclosure.

For example, in some examples, as shown in FIG. 11, the above step S170 may include the following operations.

Step S171: dividing each display pixel that the edge line passes through into two regions according to the diagonal line of the display pixel, and the sign of the slope of the diagonal line being the same as the sign of the slope of the edge line;

step S172: judging the region where the line segment of the edge line passing through the display pixel is located;

step S173: in the case where the line segment is located in one of the two regions, allowing the display pixel where the line segment is located and the display pixel that is adjacent to the region where the line segment is located in the y direction to display; and step S174: in the case where the line segment coincides with the diagonal line, allowing the display pixel where the line segment is located to display.

Figure 12A:
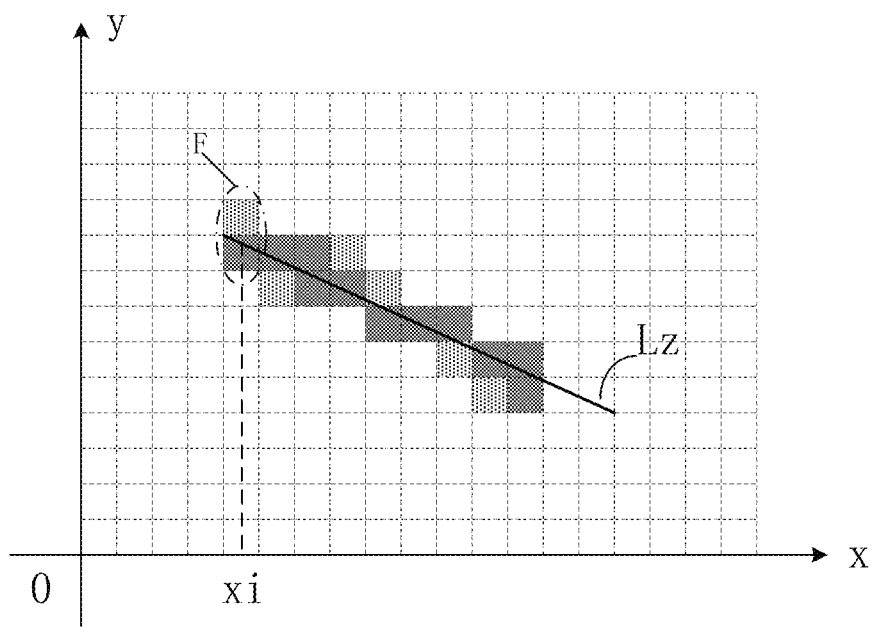
FIG. 12A is a schematic diagram showing the anti-aliasing treatment provided by at least one embodiment of the present disclosure.
Figure 12B:
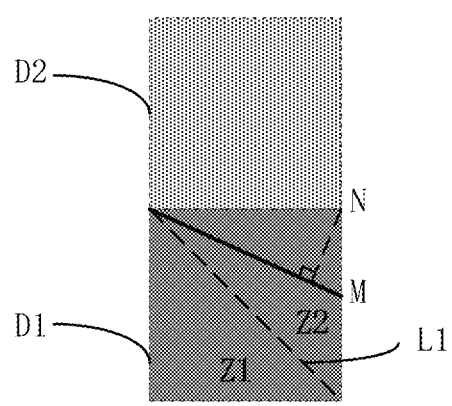
FIG. 12B is an enlarged view of area F in FIG. 12A.

FIG. 12A is a schematic diagram showing the anti-aliasing treatment provided by at least one embodiment of the present disclosure, and FIG. 12B is an enlarged view of area F in FIG. 12A. The above steps S171-S174 are described below in combination with FIG. 12A and FIG. 12B.

In the case that two coordinate points and the line between these two coordinate points need to be displayed, after obtaining the two coordinate points and the line width w, four vertices of the rectangle with the line where the two coordinate points are located as the central axis and w as the line width and the slope k can be determined, and then the anti-aliasing treatment is performed on the line with the slope k. For example, in some examples, as shown in FIG. 12A, the anti-aliasing treatment needs to be performed on the line Lz with a slope of k shown in the figure, and a plurality of squares arranged in an array in the figure represent display pixels arranged in an array.

First, in step S171, each display pixel that the edge line passes through is divided into two regions according to the diagonal line of the display pixel, and the sign of the slope of the diagonal line is the same as the sign of the slope of the edge line. For example, as shown in FIG. 12A and FIG. 12B, the display pixel D1 that the line Lz passes through is divided into two regions according to the diagonal line L1 of the display pixel D1, which are a first region Z1 and a second region Z2, respectively. For example, the sign of the slope of the diagonal line L1 is the same as the sign of the slope k of the line Lz. In this example, the slope k of the line Lz is negative, and therefore the slope of the diagonal line L1 is also negative. It should be noted that the display pixel D1 is a square, which has two diagonal lines perpendicular to each other, the slope of one diagonal line is positive, and the slope of the other diagonal line is negative. In the case that the display pixel D1 is divided into regions, the sign of the slope of the diagonal line adopted is the same as the sign of the slope k of the line Lz.

Then, in step S172, the region, where the line segment of the edge line passing through the display pixel is located, is judged. For example, as shown in FIG. 12A and FIG. 12B, in this example, the line segment of the line Lz passing through the display pixel D1 is located in the second region Z2.

In step S173, if the line segment is located in one of the two regions, the display pixel where the line segment is located and the display pixel adjacent to the region where the line segment is located in the y direction are displayed. For example, as shown in FIG. 12A and FIG. 12B, in this example, the line segment of the line Lz passing through the display pixel D1 is located in the second region Z2, and therefore the display pixel D1 and the display pixel D2 adjacent to the second region Z2 in the y direction are displayed. At this time, although the line Lz passes through the display pixel D1 rather than the display pixel D2, both the display pixel D1 and the display pixel D2 are displayed. In other examples, if the line segment of the line Lz passing through the display pixel D1 is located in the first region Z1, the display pixel D1 and the display pixel adjacent to the first region Z1 in the y direction are displayed.

In step S174, if the line segment coincides with the diagonal line, the display pixel where the line segment is located is displayed. At this time, only the display pixel that the line segment passes through is displayed, and other display pixels adjacent to the display pixel in the y direction are not displayed. This case is not shown in FIG. 12B.

For example, in some examples, the above steps S172-S174 can also be implemented by adopting the following method. The coordinate value of the center of the display pixel (that is, the center of the square) is a floating-point value. xi represents the x-axis coordinate of the center of the display pixel, any point on the line segment of the line Lz passing through the display pixel D1 can be expressed as M (xi, kx+b), k represents the slope, and b represents the offset of the line Lz. The vertices of the region where the line segment of the line Lz passing through the display pixel D1 is located (the point at the upper right corner of the display pixel D1 in FIG. 12B) can be expressed as N (int (xi)+1, int (kx+b)+1).

If the distance $d_{MN}$ from N to the line Lz is equal to $\sqrt{2}/2$, it is determined that the line segment of the line Lz passing through the display pixel D1 coincides with the diagonal line of the display pixel D1, and therefore the display pixel D1 is displayed, and other display pixels adjacent to the display pixel D1 in the y direction are not displayed. If the distance $d_{MN}$ from N to the line Lz is less than $\sqrt{2}/2$, it is determined that the line segment of the line Lz passing through the display pixel D1 is located in the second region Z2, and therefore the display pixel D1 and the display pixel D2 adjacent to the second region Z2 in the y direction are displayed. For example, the display pixel D2 is the display pixel where the coordinate point (xi, kx+b+1) is located. If the distance $d_{MN}$ from N to the line Lz is greater than $\sqrt{2}/2$, it is determined that the line segment of the line Lz passing through the display pixel D1 is located in the first region Z1, and therefore the display pixel D1 and the display pixel adjacent to the first region Z1 in the y direction (not shown in FIG. 12B) are displayed. For example, the display pixel is the display pixel where the coordinate point (xi, kx+b−1) is located.

It should be noted that because the side length of the display pixel is normalized and set to 1, the distance from the vertices of the display pixel to its diagonal line is equal to $\sqrt{2}/2$, and thereby, determining the relationship between the distance $d_{MN}$ from the vertex N to the line Lz and $\sqrt{2}/2$ is essentially consistent with determining the region where the line segment of the line Lz passing through the display pixel. In this example, because the slope k of the line Lz is negative, the point at the upper right corner of the display pixel is selected as the vertex aforementioned. In other examples, in the case that the slope of the line is positive, the point at the upper left corner of the display pixel needs to be selected as the vertex aforementioned.

Figure 13:
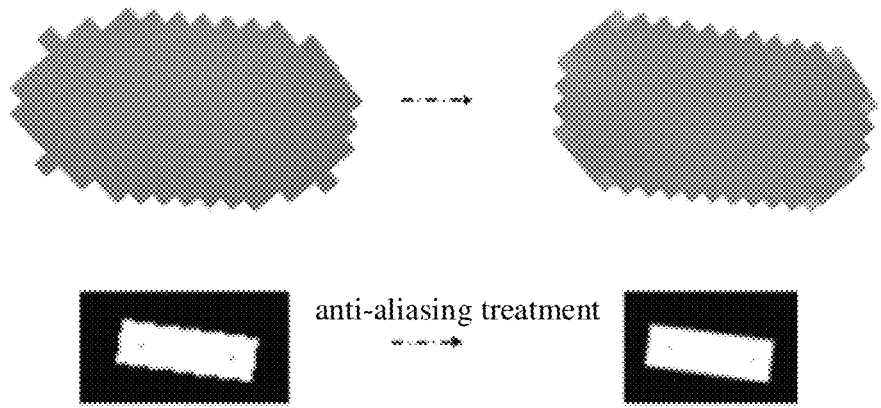
FIG. 13 is an effect comparison diagram of the anti-aliasing treatment provided by at least one embodiment of the present disclosure.

FIG. 13 is an effect comparison diagram of the anti-aliasing treatment provided by at least one embodiment of the present disclosure. According to FIG. 13, after the anti-aliasing treatment, the smoothness of the edge lines of the display pattern is greatly improved, the edge burr is significantly alleviated, and the aesthetics of the display pattern is improved.

For example, in some examples, when performing the anti-aliasing treatment, if the display pixel adjacent to the region where the line segment of the edge line is located in the y direction needs to be displayed, the transparency of the adjacent display pixel can be set to achieve a better processing effect.

For example, the transparency of the adjacent display pixel can be calculated according to the following formula:

$$Td = \left|1 - \frac{d_{MN}}{\sqrt{2}/2}\right|,$$

where Td represents the transparency, $d_{MN}$ represents the distance between the vertices of the region where the corresponding line segment is located and the line segment. For related descriptions of $d_{MN}$, vertices and so on, reference can be made to the foregoing contents, which may not be repeated here.

For example, Td=1 means opaque, Td=0 means fully transparent, and 0<Td<1 means transparent in a certain extent and the degree of transparency decreases with the increase of the value. According to the above formulas, the closer the line segment is to the vertex, the opaquer the adjacent display pixel is; the closer the line segment is to the diagonal line of the display pixel, the more transparent the adjacent display pixel is. In actual display, the product of the color value (or gray scale value) and transparency is a final displayed color value (or gray scale value). By setting the transparency, the anti-aliasing treatment can have better processing effect and make the formed handwriting more beautiful.

It should be noted that in the embodiments of the present disclosure, the method of performing the anti-aliasing treatment is not limited to the method described above, and can also be any applicable anti-aliasing treatment method, which can be determined according to actual needs, and the embodiments of the present disclosure are not limited in this aspect. For example, the method of common anti-aliasing treatment can be adopted, or the method of the anti-aliasing treatment described above can be modified and adjusted, and the embodiments of the present disclosure are not limited in this aspect.

It should be noted that in the embodiments of the present disclosure, the execution order of each step of the handwriting forming method is not limited, although the execution process of each step is described in a specific order above, it does not constitute a restriction on the embodiments of the present disclosure. Respective steps in the handwriting forming method can be executed in serial or parallel, which can be determined according to actual needs. The handwriting forming method can also include more or less steps, and the embodiments of the present disclosure are not limited in this aspect.

Figure 14:
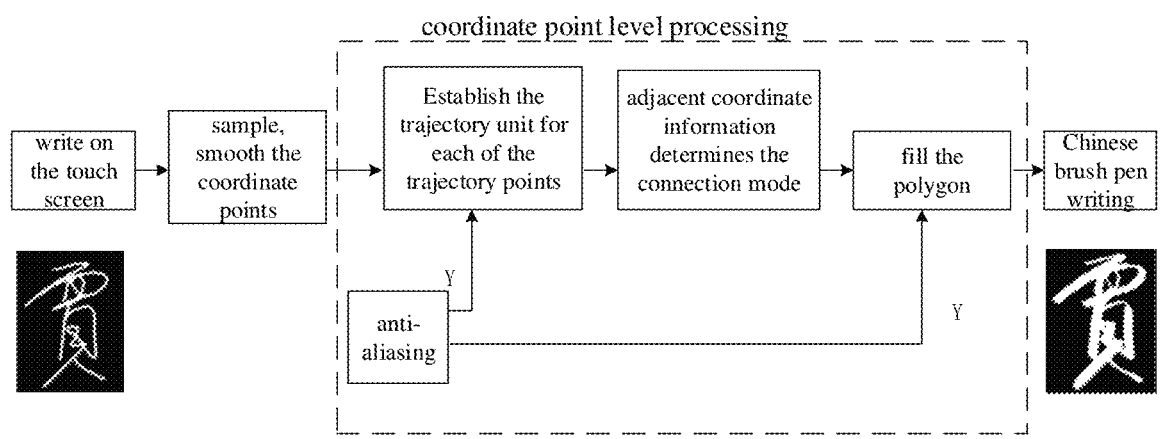
FIG. 14 is an application flow diagram of a handwriting forming method provided by at least one embodiment of the present disclosure.

FIG. 14 is an application flow diagram of a handwriting forming method provided by at least one embodiment of the present disclosure. The application flow of the handwriting forming method provided by the embodiments of the present disclosure is described exemplarily in combination with FIG. 14.

First, the user writes on the working surface of the touch device (for example, touch screen) with fingers or a stylus, for example, the writing path is the Chinese character "Jia", the touch device detects and obtains all the sampling points on the writing path and corresponding coordinates, pressure values and flag bits. Then, all the sampling points are sparsely sampled and smoothed (or interpolated) to obtain a plurality of trajectory points and trajectory information. The trajectory information includes, for example, a coordinate, a pressure value, and a flag bit.

Then, the coordinate point level processing is performed. Based on the trajectory information, the trajectory unit for each of the trajectory points is established, and the anti-aliasing treatment is performed on the edge lines of the trajectory units. The connection mode between the trajectory units corresponding to the adjacent trajectory points is determined based on the trajectory information. After the connection mode is determined, the connection points of the trajectory units are calculated according to the connection mode, and the polygon formed by the connection points of the trajectory units corresponding to the adjacent trajectory points is filled. In addition, the anti-aliasing treatment is performed on the edge lines of the filled polygon.

Through the above processing, the displayed handwriting can be formed, for example, the handwriting is displayed as the Chinese brush pen character "Jia". When the user writes any Chinese characters or strokes on the working surface of the touch device, the corresponding Chinese brush pen handwriting can be formed by using the above method, thereby providing the user with a new sensory experience and improving the user experience. The handwriting forming method can obtain beautiful Chinese brush pen handwriting, make the handwriting smooth, and can embody various strokes, the calculation amount is small, the processing efficiency is high, the real-time performance is strong, and the method is simple and practical.

Figure 15:
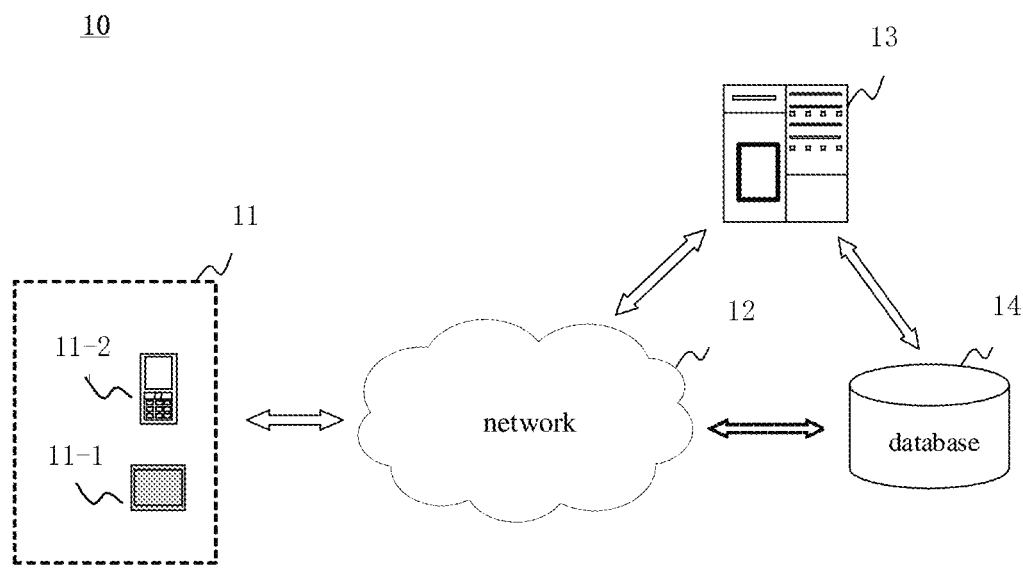
FIG. 15 is a system diagram which can be used to implement the handwriting forming method provided by the embodiments of the present disclosure.

FIG. 15 is a system diagram that can be used to implement the handwriting forming method provided by the embodiments of the present disclosure. As shown in FIG. 15, the system 10 may include a user terminal 11, a network 12, a server 13, and a database 14. For example, the system 10 can be used to implement the handwriting forming method provided by any embodiment of the present disclosure.

The user terminal 11 is, for example, a computer 11-1 or a mobile phone 11-2. It can be understood that the user terminal 11 can be any other type of electronic device that can perform data processing and has touch detection function, which can include but is not limited to a desktop computer, a notebook computer, a tablet computer, a smart phone, a smart home device, a wearable device, an in-vehicle electronic device, a monitoring device, an outdoor billboard, a conference whiteboard, etc. The user terminal 11 can also be any equipment provided with an electronic device, for example, a vehicle, a robot, etc.

The user can operate the application programs installed on the user terminal 11, the application programs transmit the user behavior data to the server 13 through the network 12, and the user terminal 11 can also receive the data transmitted by the server 13 through the network 12. The user terminal 11 can implement the handwriting forming method provided by the embodiments of the present disclosure by running a program or a thread.

In some examples, the user terminal 11 can perform the handwriting forming method by using its built-in application program. In other examples, the user terminal 11 can perform the handwriting forming method by calling the application program stored outside the user terminal 11. For example, the user can write on the working surface of the touch device of the user terminal 11 with fingers or a stylus, and the user terminal 11 performs the handwriting forming method provided by the embodiments of the present disclosure, thereby displaying the user's handwriting as Chinese brush pen handwriting.

The network 12 can be a single network or a combination of at least two different networks. For example, the network 12 can include, but is not limited to, a combination of one or more of a local area network, a wide area network, a public network, a private network, etc., for example, a wired network, a wireless network, or any combination thereof.

The server 13 can be a single server or a server group, and each server in the server group is connected through a wired network or a wireless network; and the server 13 can also be a cloud server. The server group can be centralized, such as a data center, or distributed. The server 13 can be local or remote.

The database 14 can generally refer to a device having a storage function. The database 14 is mainly used for storing various data that is used, produced and output by the user terminal 11 and the server 13 in the work. The database 14 can be local or remote. The database 14 can include various memories, for example, random access memory (RAM), read only memory (ROM), etc. The above-mentioned storage device are just some examples, and the storage device that can be used by the system 10 are not limited to these.

The database 14 can be interconnected or communicated with the server 13 or a portion thereof via the network 12, or directly interconnected or communicated with the server 13, or a combination of the above two methods can be adopted.

In some examples, the database 14 can be a stand-alone device. In other examples, the database 14 can also be integrated in at least one of the user terminal 11 and the server 13. For example, the database 14 can be arranged on the user terminal 11 or on the server 13. For another example, the database 14 can also be distributed, one part of which is arranged on the user terminal 11, and the other part of which is arranged on the server 13.

At least one embodiment of the present disclosure also provides a handwriting forming apparatus. The handwriting forming apparatus can obtain beautiful Chinese brush pen handwriting, make the handwriting smooth, and can embody various strokes, the calculation amount is small, the processing efficiency is high, the real-time performance is strong, and the apparatus is simple and practical.

Figure 16A:
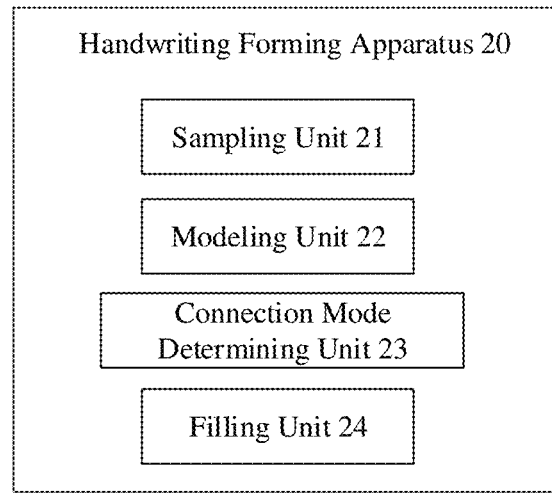
FIG. 16A is a schematic block diagram of a handwriting forming apparatus provided by at least one embodiment of the present disclosure.

FIG. 16A is a schematic block diagram of a handwriting forming apparatus provided by at least one embodiment of the present disclosure. As shown in FIG. 16A, the handwriting forming apparatus 20 includes a sampling unit 21, a modeling unit 22, a connection mode determining unit 23, and a filling unit 24. For example, the handwriting forming apparatus 20 can be applied to application programs such as writing software and drawing software, and can also be applied to any device or system that needs to form Chinese brush pen handwriting, and the embodiments of the present disclosure are not limited in this aspect.

The sampling unit 21 is configured to determine a group of plurality of trajectory points according to a plurality of sampling points on the writing path on the working surface of the touch device and obtain the trajectory information of each of the plurality of trajectory points. For example, the trajectory information includes a coordinate, a flag bit and a pressure value, and the flag bit includes data indicating whether a corresponding trajectory point is a pen drop point. For example, the sampling unit 21 can perform the step S110 of the handwriting forming method shown in FIG. 1. The modeling unit 22 is configured to establish a plurality of trajectory units in a raindrop shape corresponding to a plurality of trajectory points in one-to-one correspondence based on the trajectory information. For example, the modeling unit 22 can perform the step S120 of the handwriting forming method shown in FIG. 1. The connection mode determination unit 23 is configured to determine the connection mode between the trajectory units corresponding to the adjacent trajectory points based on the trajectory information. For example, the connection mode determination unit 23 can perform the step S130 of the handwriting formation method shown in FIG. 1. The filling unit 24 is configured to calculate the connection points of the trajectory units according to the connection mode, and fill the polygon formed by the connection points of the trajectory units corresponding to the adjacent trajectory points, so as to form the handwriting for displaying. For example, the filling unit 24 can perform the step S140 of the handwriting forming method shown in FIG. 1.

For example, the sampling unit 21, the modeling unit 22, the connection mode determining unit 23, and the filling unit 24 can be hardware, software, firmware, and any feasible combination thereof. For example, the sampling unit 21, the modeling unit 22, the connection mode determining unit 23 and the filling unit 24 can be dedicated or general-purpose circuits, chips, or devices, etc., or can be a combination of a processor and a memory. Regarding the specific implementation form of each of the above units, the embodiments of the present disclosure are not limited in this aspect.

Figure 16B:
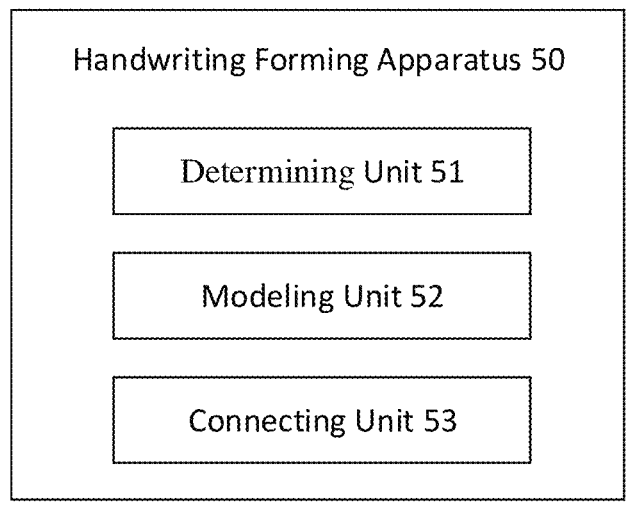
FIG. 16B is a schematic block diagram of another handwriting forming apparatus provided by at least one embodiment of the present disclosure.

FIG. 16B is a schematic block diagram of another handwriting forming apparatus provided by at least one embodiment of the present disclosure. As shown in FIG. 16B, the handwriting forming apparatus 50 includes a determining unit 51, a modeling unit 52, and a connecting unit 53. For example, the handwriting forming apparatus 50 can be applied to application programs such as writing software and drawing software, and can also be applied to any device or system that needs to form Chinese brush pen handwriting, and the embodiments of the present disclosure are not limited in this aspect.

The determining unit 51 is configured to determine a group of plurality of trajectory points and obtain trajectory information of each of the plurality of trajectory points. The trajectory information comprises a pressure value. For example, the determining unit 51 may perform the step S210 of the handwriting forming method shown in FIG. 2A. The modeling unit 52 is configured to establish a plurality of trajectory units corresponding to the plurality of trajectory points in one-to-one correspondence based on the trajectory information. For example, the modeling unit 52 may perform the step S220 of the handwriting forming method shown in FIG. 2A. The connecting unit 53 is configured to connect the plurality of trajectory units to form a handwriting for displaying. For example, the connecting unit 53 may perform the step S230 of the handwriting forming method shown in FIG. 2A.

The size of each trajectory unit is determined based on a pressure sensing amount corresponding to the trajectory unit, and the pressure sensing amount is obtained based on the pressure value of a corresponding trajectory point. In the case where the pressure value of the corresponding trajectory point is less than a first threshold, the pressure sensing amount is a first constant regardless of whether the pressure value of the corresponding trajectory point changes. In the case where the pressure value of the corresponding trajectory point is greater than or equal to a second threshold, the pressure sensing amount is a second constant regardless of whether the pressure value of the corresponding trajectory point changes. In the case where the pressure value of the corresponding trajectory point is no less than the first threshold and is less than the second threshold, the pressure sensing amount increases along with increasing of the pressure value of the corresponding trajectory point.

For example, the determining unit 51, the modeling unit 52, and the connecting unit 53 can be hardware, software, firmware, and any feasible combination thereof. For example, the determining unit 51, the modeling unit 52, and the connecting unit 53 can be dedicated or general-purpose circuits, chips, or devices, etc., or can be a combination of a processor and a memory. Regarding the specific implementation form of each of the above units, the embodiments of the present disclosure are not limited in this aspect.

It should be noted that in the embodiments of the present disclosure, each unit of the handwriting forming apparatus 20 and the handwriting forming apparatus 50 corresponds to each step of the aforementioned handwriting forming method, and regarding the specific function of the handwriting forming apparatus 20 and the handwriting forming apparatus 50, reference can be made to the relevant description of the handwriting forming method, which may not be repeated here. The components and structures of the handwriting forming apparatus 20 shown in FIG. 16A and the handwriting forming apparatus 50 shown in FIG. 16B are only exemplary rather than restrictive, and the handwriting forming apparatus 20 and the handwriting forming apparatus 50 can also include other components and structures as required.

At least one embodiment of the present disclosure also provides an electronic device, the electronic device includes a processor and a memory, one or more computer program modules are stored in the memory and configured for execution by the processor, and one or more computer program modules include instructions for implementing the handwriting forming method provided by any embodiment of the present disclosure. The electronic device can obtain beautiful Chinese brush pen handwriting, make the handwriting smooth, and can embody various strokes, the calculation amount is small, the processing efficiency is high, the real-time performance is strong, and the device is simple and practical.

Figure 17:
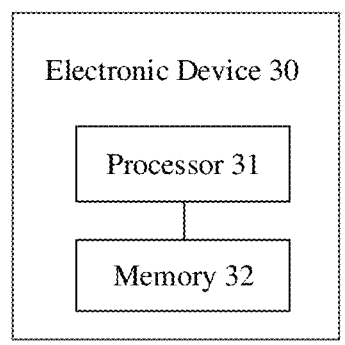
FIG. 17 is a schematic block diagram of an electronic device provided by at least one embodiment of the present disclosure.

FIG. 17 is a schematic block diagram of an electronic device provided by at least one embodiment of the present disclosure. As shown in FIG. 17, the electronic device 30 includes a processor 31 and a memory 32. The memory 32 is used to store non-volatile computer-readable instructions (for example, one or more computer program modules). The processor 31 is used to run non-volatile computer-readable instructions, and when the non-volatile computer-readable instructions are run by the processor 31, one or more steps of the handwriting forming method described above can be performed. The memory 32 and the processor 31 can be interconnected by a bus system and/or other forms of connection mechanism (not shown). For example, the electronic device 30 can adopt operating systems such as Windows, Android, etc., and the handwriting forming method according to the embodiments of the present disclosure is realized by the application program running in the operating system.

For example, the processor 31 can be a central processing unit (CPU), a graphics processing unit (GPU), a digital signal processor (DSP) or other forms of processing units with data processing capability and/or program execution capability, for example, a field programmable gate array (FPGA), etc. For example, the central processing unit (CPU) can be X86 or ARM architecture and so on. The processor 31 can be a general-purpose processor or a dedicated processor and can control other components in the electronic device 30 to perform desired functions.

For example, the memory 32 can includes any combination of one or more computer program products, and the computer program products can include various forms of computer-readable storage media, such as the volatile memory and/or the non-volatile memory. The volatile memory can include, for example, a random access memory (RAM) and/or a cache memory (cache), etc. The non-volatile memory can include, for example, a read only memory (ROM), a hard disk, an erasable programmable read only memory (EPROM), a portable compact disk read only memory (CD-ROM), a USB memory, a flash memory, and so on. One or more computer program modules can be stored on computer-readable storage media, and the processor 31 can run one or more computer program modules to implement various functions of the electronic device 30. The computer-readable storage media can also store various application programs and various data as well as various data used and/or produced by the application programs.

It should be noted that in the embodiments of the present disclosure, for the specific functions and technical effects of the electronic device 30, reference can be made to the above description of the handwriting forming method, which may not be repeated here.

Figure 18:
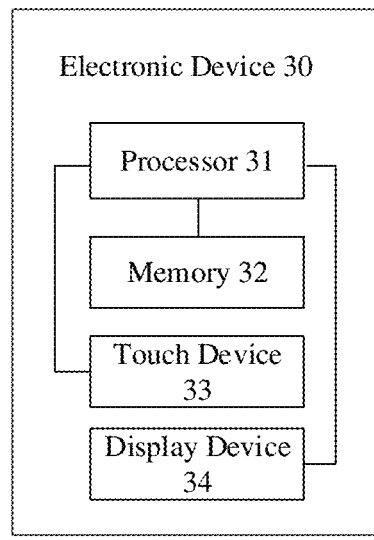
FIG. 18 is a schematic block diagram of another electronic device provided by at least one embodiment of the present disclosure.

FIG. 18 is a schematic block diagram of another electronic device provided by at least one embodiment of the present disclosure. For example, as shown in FIG. 18, in addition to the processor 31 and the memory 32, the electronic device 30 can further include a touch device 33 and a display device 34.

For example, the touch device 33 is configured to acquire an initial handwriting on the working surface of the touch device 33. For example, the touch device 33 can be a touch screen or a touch pad. The touch screen can be a capacitive touch screen, such as a self-capacitive touch screen or a mutual-capacitive touch screen, and can also be a resistive touch screen, a surface acoustic wave touch screen, an infrared touch screen, etc. For example, the touch device 33 can include a touch sensor and a controller (for example, a driver IC), the controller receives an electrical signal collected by the touch sensor, processes the electrical signal to obtain a touch signal, and provides the touch signal to the processor 31 for further processing, so as to realize the handwriting forming method provided by the embodiments of the present disclosure. The embodiments of the present disclosure do not limit the type, structure, and communication mode of the touch device 33. The touch device 33 includes a working surface with a certain area, the user can write directly on the working surface of the touch device 33 with his/her fingers, or write on the working surface of the touch device 33 with an active stylus or a passive stylus, and the embodiments of the present disclosure are not limited in this aspect. Here, the working surface refers to a surface for detecting the touch operations of the user, such as the touch surface of the touch device 33. It should be noted that in the embodiments of the present disclosure, the type of the touch device 33 is not limited, and it can be not only a touch screen, but also any device with touch function such as an interactive whiteboard, which can be determined according to actual needs.

For example, the display device 34 is configured to display the handwriting formed by the handwriting forming method. For example, the handwriting forming method is the handwriting forming method provided by any embodiment of the present disclosure. The display device 34 is, for example, an LCD display screen, an OLED display screen, a QLED display screen, a projection component, a VR head mounted display device (for example, a VR helmet, VR glasses, etc.), an AR display device, etc., and the embodiments of the present disclosure are not limited in this aspect. The display device 34 can display the handwriting formed by the handwriting forming method provided by the embodiments of the present disclosure, such as Chinese brush pen handwriting.

For example, in some examples, the touch device 33 and the display device 34 are two independent devices, the touch device 33 has a touch function but does not have a display function, and the display device 34 has a display function but does not have a touch function. For example, in other examples, the touch device 33 and the display device 34 are the same one device, which has both the touch function and the display function. Regarding the structure form of the touch device 33 and the display device 34, reference can be made to the conventional design, which may not be described in detail here.

Figure 19:
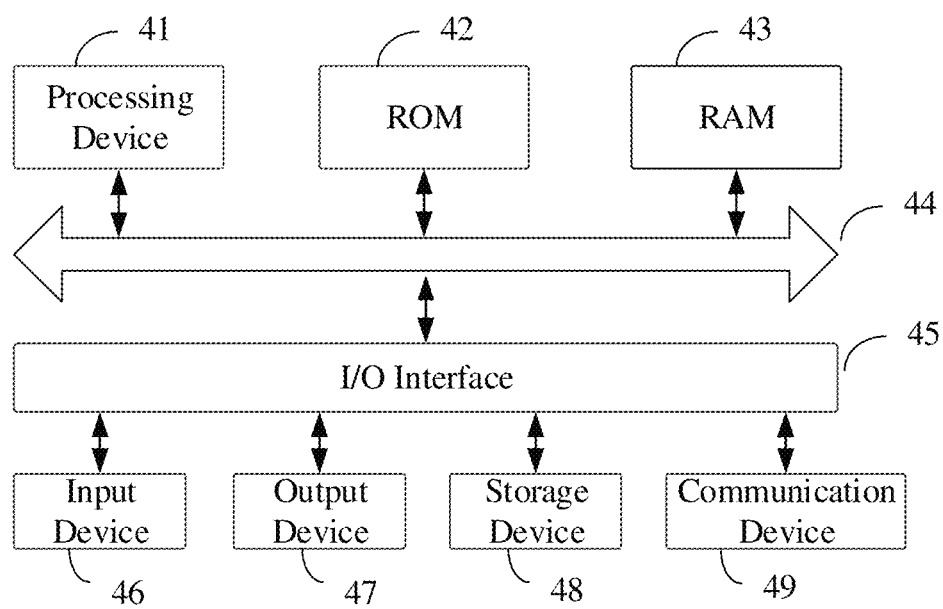
FIG. 19 is a schematic block diagram of yet another electronic device provided by at least one embodiment of the present disclosure.

FIG. 19 is a schematic block diagram of yet another electronic device provided by at least one embodiment of the present disclosure. The electronic device 40 is suitable for implementing, for example, the handwriting forming method provided by the embodiments of the present disclosure. The electronic device 40 can be a terminal device and so on. It should be noted that the electronic device 40 shown in FIG. 19 is merely an example, which does not bring any limitation to the function and use scope of the embodiments of the present disclosure.

As shown in FIG. 19, the electronic device 40 can include a processing device (for example, a central processing unit, a graphics processor, etc.) 41, which can perform various appropriate actions and processes according to the programs stored in the read only memory (ROM) 42 or the programs loaded into the random access memory (RAM) 43 from the storage device 48. In the RAM 43, various programs and data required for the operations of the electronic device 40 are also stored. The processing device 41, ROM 42 and RAM 43 are connected to each other through a bus 44. Input/output (I/O) interface 45 is also connected to the bus 44.

Generally, the following devices can be connected to the I/O interface 45: an input device 46 including, for example, a touch screen, a touch pad, a keyboard, a mouse, a camera, a microphone, an accelerometer, a gyroscope, etc.; an output device 47 including, for example, a liquid crystal display (LCD), a loudspeaker, a vibrator, etc.; a storage device 48 including, for example, a magnetic tape, a hard disk, etc.; and a communication device 49. The communication device 49 can allow the electronic device 40 to communicate with other electronic device to exchange data in wireless way or wired way. Although FIG. 19 shows an electronic device 40 with various devices, it should be understood that it is not required to implement or have all the devices shown, and that the electronic device 40 can alternatively implement or have more or less devices.

For example, according to the embodiments of the present disclosure, the above-mentioned handwriting forming method can be implemented as a computer software program. For example, the embodiments of the present disclosure include a computer program product, which includes computer programs carried on non-volatile computer-readable media, and the computer programs include program codes for executing the above-mentioned handwriting forming method. In such embodiments, the computer programs can be downloaded and installed from the network through the communication device 49, or from the storage device 48, or from ROM 42. When the computer programs are executed by the processing device 41, the functions defined in the handwriting forming method provided by the embodiments of the present disclosure can be executed.

The following statements should be noted.

(1) The attached drawings of the embodiments of the present disclosure only involves the structures related to the embodiments of the present disclosure, and other structures can be referred to the general design.

(2) In the case of no conflicts, the features in the same embodiments and different embodiments of the present disclosure can be combined with each other.

The above are only exemplary embodiments of the present disclosure, but the protection scope of the present disclosure is not limited to this, and the protection scope of the present disclosure should be subject to the protection scope of the claims.

What is claimed is:

1. A handwriting forming method, comprising: determining a group of a plurality of trajectory points and obtaining trajectory information of each of the plurality of trajectory points, wherein the trajectory information comprises a pressure value;
   establishing a plurality of trajectory units corresponding to the plurality of trajectory points in one-to-one correspondence based on the trajectory information; and
   connecting the plurality of trajectory units to form a handwriting for displaying, wherein a size of each trajectory unit is determined based on a pressure sensing amount corresponding to the trajectory unit, and the pressure sensing amount is obtained based on the pressure value of a corresponding trajectory point; and in a case where the pressure value of the corresponding trajectory point is less than a first threshold, the pressure sensing amount is a first constant regardless of whether the pressure value of the corresponding trajectory point changes.

2. The method according to claim 1, wherein, in a case where the pressure value of the corresponding trajectory point is greater than or equal to a second threshold, the pressure sensing amount is a second constant regardless of whether the pressure value of the corresponding trajectory point changes.

3. The method according to claim 2, wherein, in a case where the pressure value of the corresponding trajectory point is no less than the first threshold and is less than the second threshold, the pressure sensing amount increases along with increasing of the pressure value of the corresponding trajectory point.

4. The method according to claim 1, wherein the first threshold is equal to 0.4, and the first constant is equal to 0.25.

5. The method according to claim 2, wherein the second threshold is equal to 0.8, and the second constant is equal to 1.

6. The method according to claim 3, wherein the first threshold is equal to 0.4, the first constant is equal to 0.25, the second threshold is equal to 0.8, and the second constant is equal to 1; and the pressure sensing amount is calculated according to a pressure sensing function:

$$Pz = \begin{cases} 0.25, P < 0.4 \\ P^2/0.64, 0.4 \leq P < 0.8, \\ 1, P \geq 0.8 \end{cases}$$

where Pz represents the pressure sensing amount and P represents the pressure value of the corresponding trajectory point.

7. The method according to claim 1, wherein, before the establishing the plurality of trajectory units, the method further comprises: performing compensation on the pressure value in the trajectory information.

8. The method according to claim 7, wherein the performing compensation on the pressure value in the trajectory information comprises: selecting continuous Z trajectory points comprising a pen drop point, wherein the pen drop point is one trajectory point among the Z trajectory points and is a first trajectory point in a trajectory, and Z is a positive integer; adding a compensation value to the pressure value in the trajectory information of each of the Z trajectory points, so as to obtain an updated pressure value; and replacing the pressure value in the trajectory information with the updated pressure value.

9. The method according to claim 8, wherein 5≤Z≤15.

10. The method according to claim 8, wherein Z compensation values corresponding to the Z trajectory points are successively reduced.

11. The method according to claim 8, wherein the trajectory information further comprises a flag bit, and the flag bit comprises data indicating whether a corresponding trajectory point is the pen drop point.

12. The method according to claim 1, wherein the size of the trajectory unit is a maximum distance between two points on edges of the trajectory unit.

13. The method according to claim 1, wherein the size of the trajectory unit is a radius, an edge length, or a diagonal of the trajectory unit.

14. The method according to claim 1, wherein the connecting the plurality of trajectory units to form the handwriting for displaying comprises: determining a connection mode between trajectory units corresponding to adjacent trajectory points based on the trajectory information; and calculating connection points of the trajectory units according to the connection mode, and filling a polygon formed by the connection points of the trajectory units corresponding to the adjacent trajectory points, so as to form the handwriting for displaying.

15. The method according to claim 1, further comprising: performing an anti-aliasing treatment on an edge line of a filled pattern.

16. The method according to claim 15, wherein the performing the anti-aliasing treatment on the edge line of the filled pattern comprises: dividing each display pixel that the edge line passes through into two regions according to a diagonal line of the display pixel, wherein a sign of a slope of the diagonal line is same as a sign of a slope of the edge line; judging a region where a line segment of the edge line passing through the display pixel is located; in a case where the line segment is located in one of the two regions, allowing the display pixel where the line segment is located and a display pixel that is adjacent to the region where the line segment is located in a y direction to display; and in a case where the line segment coincides with the diagonal line, allowing the display pixel where the line segment is located to display.

17. The method according to claim 16, wherein a transparency of the display pixel that is adjacent to the region where the line segment is located in the y direction is calculated according to a formula:

$$Td = \left|1 - \frac{d_{MN}}{\sqrt{2}/2}\right|,$$

where Td represents the transparency, and $d_{MN}$ represents a distance between vertices of the region where the line segment is located and the line segment.

18. A handwriting forming apparatus, comprising a processor configured to control the following units:
a determining unit, configured to determine a group of plurality of trajectory points and obtain trajectory information of each of the plurality of trajectory points, wherein the trajectory information comprises a pressure value; a modeling unit, configured to establish a plurality of trajectory units corresponding to the plurality of trajectory points in one-to-one correspondence based on the trajectory information; and a connecting unit, configured to connect the plurality of trajectory units to form a handwriting for displaying, wherein a size of each trajectory unit is determined based on a pressure sensing amount corresponding to the trajectory unit, and the pressure sensing amount is obtained based on the pressure value of a corresponding trajectory point; and in a case where the pressure value of the corresponding trajectory point is less than a first threshold, the pressure sensing amount is a first constant regardless of whether the pressure value of the corresponding trajectory point changes.

19. The handwriting forming apparatus according to claim 18, wherein, in a case where the pressure value of the corresponding trajectory point is greater than or equal to a second threshold, the pressure sensing amount is a second constant regardless of whether the pressure value of the corresponding trajectory point changes.

20. An electronic device, comprising: a processor; and a memory, comprising one or more computer program modules, wherein the one or more computer program modules are stored in the memory and configured to be executed by the processor, and the one or more computer program modules comprise instructions for implementing the handwriting forming method according to claim 1.

* * * * *